United States Patent
Choi

(10) Patent No.: US 11,578,832 B2
(45) Date of Patent: Feb. 14, 2023

(54) COMPACT FOLDABLE FRAME

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 87 days.

(21) Appl. No.: 17/142,711

(22) Filed: Jan. 6, 2021

(65) Prior Publication Data
US 2021/0222824 A1 Jul. 22, 2021

(30) Foreign Application Priority Data

Jan. 20, 2020 (CN) .......................... 202020132788.2
Jan. 20, 2020 (CN) .......................... 202020133275.3

(51) Int. Cl.
*A47B 3/091* (2006.01)
*F16M 11/38* (2006.01)
*A47C 19/12* (2006.01)
*A47C 4/00* (2006.01)

(52) U.S. Cl.
CPC ........... *F16M 11/38* (2013.01); *A47B 3/0913* (2013.01); *A47C 4/00* (2013.01); *A47C 19/128* (2013.01)

(58) Field of Classification Search
USPC ........................................ 248/188.1, 188.6
See application file for complete search history.

(56) References Cited

U.S. PATENT DOCUMENTS

| 1,063,642 | A | 6/1913 | Birdsell |
| 2,136,569 | A | 11/1938 | Trimpi |
| 2,803,033 | A | 8/1957 | Rachman |
| 2,803,050 | A | 8/1957 | Birger Fernberg |
| 2,868,599 | A | 1/1959 | Roggio |
| 3,075,809 | A | 1/1963 | Wilson |
| 3,187,373 | A | 6/1965 | Fisher |
| 3,304,891 | A | 2/1967 | Rachman |
| 3,368,504 | A | 2/1968 | Cohen |

(Continued)

FOREIGN PATENT DOCUMENTS

| CA | 2971886 A1 | 12/2018 |
| CN | 109431070 A | 3/2019 |

(Continued)

OTHER PUBLICATIONS

U.S. Appl. No. 17/142,668, filed Jan. 6, 2021.

(Continued)

*Primary Examiner* — Alfred J Wujciak
(74) *Attorney, Agent, or Firm* — Morgan, Lewis & Bockius LLP

(57) ABSTRACT

A frame includes a mounting assembly having a plurality of mounting members connected to or integrally formed with each other. The frame also includes first and second leg assemblies pivotally connected with the mounting assembly at first and second sides of the mounting assembly, respectively. The first and second leg assemblies are foldable into an interior defined by the mounting assembly and, when folded, are substantially on the same plane as the mounting assembly. The frame further includes one or more supporting assemblies to help stabilize the first and second leg assemblies and support the mounting assembly when the frame is unfolded. Thus, the frame is compact when folded and stable when in use.

14 Claims, 25 Drawing Sheets

(56) References Cited

U.S. PATENT DOCUMENTS

| | | |
|---|---|---|
| 3,410,232 A | 11/1968 | Bills |
| 3,410,327 A | 11/1968 | Ausnit |
| 3,861,328 A | 1/1975 | Lawless |
| 4,111,482 A * | 9/1978 | Jones .................. A47B 3/14 297/139 |
| 4,191,111 A | 3/1980 | Emmert |
| 4,285,105 A | 8/1981 | Kirkpatrick |
| 4,561,108 A | 12/1985 | Kamp |
| 4,792,240 A | 12/1988 | Ausnit |
| 5,325,794 A | 7/1994 | Hontani |
| 5,392,718 A | 2/1995 | Stevens |
| 5,483,710 A | 1/1996 | Chan |
| 5,745,954 A | 5/1998 | Shogan |
| 5,857,229 A | 1/1999 | Magnani, Jr. |
| 5,921,623 A | 7/1999 | Nye |
| 6,223,366 B1 | 5/2001 | Cheng |
| 6,347,831 B1 | 2/2002 | Nye |
| 6,363,550 B1 | 4/2002 | Wang |
| 6,508,262 B1 | 1/2003 | Takayama |
| 6,530,331 B2 * | 3/2003 | Stanford .................. B32B 3/30 108/132 |
| 6,644,734 B1 | 11/2003 | Tseng |
| 6,752,091 B2 | 6/2004 | Glover |
| 6,843,183 B2 | 1/2005 | Strong |
| 6,971,321 B1 | 12/2005 | Strong |
| 7,059,254 B2 | 6/2006 | Strong et al. |
| 7,096,799 B2 | 8/2006 | Strong et al. |
| 7,097,380 B2 | 8/2006 | Lee |
| 7,171,910 B2 | 2/2007 | Neunzert et al. |
| 7,260,871 B2 | 8/2007 | Borchardt |
| 7,428,872 B2 | 9/2008 | Strong et al. |
| 7,475,643 B2 | 1/2009 | Haney et al. |
| 7,475,644 B2 | 1/2009 | Strong et al. |
| 7,634,969 B2 | 12/2009 | Neunzert et al. |
| 7,640,870 B2 | 1/2010 | Strong et al. |
| 7,644,667 B2 | 1/2010 | Strong et al. |
| 7,735,431 B2 | 6/2010 | Neunzert et al. |
| 7,874,303 B2 | 1/2011 | Xie |
| 8,006,630 B2 | 8/2011 | Strong et al. |
| 8,033,228 B2 | 10/2011 | Haney et al. |
| 8,042,475 B2 | 10/2011 | Larcom et al. |
| 8,113,130 B2 | 2/2012 | Leng |
| 8,132,517 B2 | 3/2012 | Leng |
| 8,156,875 B2 | 4/2012 | Neunzert et al. |
| 8,166,894 B1 | 5/2012 | Branch |
| 8,302,541 B2 | 11/2012 | Haney et al. |
| 8,342,107 B2 | 1/2013 | Mover et al. |
| 8,534,205 B1 | 9/2013 | Johnson et al. |
| 8,578,865 B2 | 11/2013 | Haney et al. |
| 8,622,007 B2 * | 1/2014 | Peery .................. A47B 7/02 108/132 |
| 8,746,155 B2 | 6/2014 | Haney et al. |
| 8,757,069 B2 | 6/2014 | Peery et al. |
| 8,904,943 B2 | 12/2014 | Jin |
| 9,027,952 B2 | 5/2015 | Zhu |
| 9,103,368 B2 | 8/2015 | Mendes |
| D748,418 S | 2/2016 | Johnson et al. |
| 9,277,808 B2 | 3/2016 | Cai et al. |
| 9,282,812 B2 | 3/2016 | Chang |
| D756,694 S | 5/2016 | Johnson et al. |
| 9,351,563 B2 * | 5/2016 | Bennett .................. A47B 3/08 |
| 9,462,880 B1 | 10/2016 | Lin |
| 10,159,334 B1 | 12/2018 | Wang |
| 10,470,561 B2 | 11/2019 | Clegg et al. |
| 11,234,525 B1 | 2/2022 | Tsai |
| 2003/0089286 A1 | 5/2003 | Wang |
| 2004/0070235 A1 | 4/2004 | Gregory |
| 2004/0187749 A1 | 9/2004 | Zhurong |
| 2004/0195869 A1 | 10/2004 | Zhurong |
| 2005/0005826 A1 | 1/2005 | Strong |
| 2005/0097829 A1 | 5/2005 | Seo |
| 2005/0103239 A1 * | 5/2005 | Neunzert .................. F16B 12/24 108/132 |
| 2005/0241550 A1 | 11/2005 | Neunzert |
| 2005/0279260 A1 | 12/2005 | Stanford |
| 2006/0062632 A1 | 3/2006 | Jang |
| 2006/0181114 A1 | 8/2006 | Nye |
| 2006/0196395 A1 | 9/2006 | Lin |
| 2007/0079441 A1 | 4/2007 | Chen |
| 2008/0078310 A1 | 4/2008 | VanNimwegen |
| 2013/0000528 A1 | 1/2013 | Jin |
| 2013/0025507 A1 | 1/2013 | Jin |
| 2013/0025509 A1 | 1/2013 | Jin |
| 2013/0233210 A1 | 9/2013 | Jin |
| 2014/0030012 A1 | 1/2014 | Lee |
| 2014/0070070 A1 | 3/2014 | Shinoda |
| 2014/0099155 A1 | 4/2014 | Chen |
| 2014/0130837 A1 | 5/2014 | Sy-Facunda |
| 2014/0345506 A1 | 11/2014 | Clegg |
| 2016/0227919 A1 | 8/2016 | Turner |
| 2016/0348395 A1 | 12/2016 | Jin |
| 2017/0013955 A1 * | 1/2017 | Lin .................. A47B 3/087 |
| 2017/0325592 A1 | 11/2017 | Suh |
| 2017/0340100 A1 | 11/2017 | Tsai |
| 2018/0153302 A1 | 6/2018 | Jiang |
| 2018/0171648 A1 | 6/2018 | Woodward |
| 2019/0150608 A1 | 5/2019 | Johnson et al. |
| 2019/0284831 A1 | 9/2019 | Volin |
| 2019/0292808 A1 | 9/2019 | Dotterweich |
| 2020/0029684 A1 | 1/2020 | Jiang |
| 2020/0390233 A1 | 12/2020 | Leng |
| 2021/0112968 A1 | 4/2021 | Ponomar |
| 2021/0177135 A1 | 6/2021 | Leng |
| 2021/0274929 A1 | 9/2021 | Choi |
| 2021/0274930 A1 | 9/2021 | Choi |
| 2021/0345776 A1 | 11/2021 | Choi |
| 2022/0022643 A1 | 1/2022 | Choi |

FOREIGN PATENT DOCUMENTS

| | | |
|---|---|---|
| DE | 29515948 U1 | 1/1996 |
| EP | 1492432 B1 | 10/2016 |
| WO | WO 2011097404 A1 | 8/2011 |
| WO | WO 2013000149 A1 | 1/2013 |

OTHER PUBLICATIONS

U.S. Appl. No. 16/838,939, filed Apr. 2, 2020.
U.S. Appl. No. 16/838,944, filed Apr. 2, 2020.
U.S. Appl. No. 16/838,947, filed Apr. 2, 2020.
U.S. Appl. No. 16/951,461, filed Nov. 18, 2020.
U.S. Appl. No. 17/192,148, filed Mar. 4, 2021.
U.S. Appl. No. 17/368,284, filed Jul. 6, 2021.
U.S. Appl. No. 17/589,174, filed Jan. 31, 2022.

* cited by examiner

COMPACT FOLDABLE FRAME

CROSS-REFERENCE TO RELATED APPLICATIONS

The present application claims priority to Chinese Utility Model Applications CN 202020132788.2 filed Jan. 20, 2020 and CN 202020133275.3 filed Jan. 20, 2020. The disclosure of each application is incorporated herein for all purposes by reference in its entirety.

FIELD OF THE INVENTION

The present invention generally relates to frames and, in particular, to compact foldable frames having supporting assemblies.

BACKGROUND

Foldable tables are more and more popular these days. A typical foldable table usually includes a foldable frame to support a table panel. However, many existing foldable frames are not very stable when in use. To help stabilize the frames, some existing foldable frames include additional supporting structures. However, with additional supporting structures, it is usually difficult to fold the legs onto the table panel and thus often leave some spaces between the folded legs and the table panel. As such, when folded, the frames and tables are not compact and take up unnecessary spaces. Consequently, the frames and tables are not convenient for storage and transportation.

Given the current state of the art, there remains a need for frames that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present disclosure provides compact foldable frames with enhanced stability.

In various exemplary embodiments, the present disclosure provides a foldable frame including a mounting assembly, first and second leg assemblies, and first and second supporting assemblies. The mounting assembly includes a first mounting member and a second mounting member spaced apart from the first mounting member. The mounting assembly also includes a connecting member disposed between the first and second mounting members. The connecting member has a first end portion connected to or integrally formed with the first mounting member and a second end portion connected to or integrally formed with the second mounting member. The first leg assembly is pivotally connected with the mounting assembly at a first side of the mounting assembly. The second leg assembly is pivotally connected with the mounting assembly at a second side of the mounting assemble. The first supporting assembly is pivotally connected with the first leg assembly and the connecting member of the mounting assembly and configured to control rotation of the first leg assembly with respect to the mounting assembly. The second supporting assembly is pivotally connected with the second leg assembly and the connecting member of the mounting assembly and configured to control rotation of the second leg assembly with respect to the mounting assembly. When folded, the first and second leg assemblies are disposed in an interior defined by the mounting assembly and are substantially on a same plane as the mounting assembly.

In some exemplary embodiments, the mounting assembly further includes third and fourth mounting members, each connected to or integrally formed with the first and second mounting members. The third and fourth mounting members are spaced apart from each other with the third mounting member disposed at the first side of the mounting assembly and the fourth mounting member disposed at the second side of the mounting assembly. A respective leg assembly in the first and second leg assemblies is pivotally connected with the mounting assembly by one or more mounting couplers connected to or integrally formed with a corresponding mounting member in the third and fourth mounting members.

In some exemplary embodiments, each of the one or more mounting couplers includes one or more lugs. The respective leg assembly includes one or more legs, and each respective leg in the one or more legs is pivotally coupled with the one or more lugs of a corresponding coupler in the one or more couplers by a fastener through openings formed at the one or more lugs and at the respective leg.

In some exemplary embodiments, each of the one or more mounting couplers includes an interference piece that abuts the respective leg assembly when unfolded, thereby assisting in stabilizing the foldable frame.

In some exemplary embodiments, a respective supporting assembly in the first and second supporting assemblies includes first, second and third members and a controller. The first member is pivotally connected with a corresponding leg assembly in the first and second leg assemblies. The controller is connected with the first member and selectively movable along the first member. Each of the second and third members has a first end portion pivotally connected with the controller and a second end portion pivotally connected with the connecting member of the mounting assembly.

In an exemplary embodiment, the second end portion of the second or third member of the respective supporting assembly is formed with a hole through which the connecting member of the mounting assembly passes.

In some exemplary embodiments, the second or third member of the first supporting assembly is integrally formed with the second or third member of the second supporting assembly as a unitary piece.

In an exemplary embodiment, the connecting member of the mounting assembly passes a hole formed in the unitary piece.

In some exemplary embodiments, the connecting member of the mounting assembly includes one or more holding segments, each configured to couple with the second end portion of the second or third member of the respective supporting assembly and to limit movement of the second end portion of the second or third member along the connecting member of the mounting assembly.

In an exemplary embodiment, one or more stoppers are disposed at the connecting member of the mounting assembly and configured to limit movement of the second end portion of the second or third member along the connecting member of the mounting assembly.

In another exemplary embodiment, one or more coupling pieces are fixedly disposed at the connecting member of the mounting assembly. Each coupling piece is configured to pivotally connect the second members of the first and second supporting assemblies or to pivotally connect the third members of the first and second supporting assemblies.

In some exemplary embodiments, each of the first and second mounting members includes first and second mounting segments. The foldable frame further includes third and fourth couplers. The third coupler pivotally connects proximal end portions of the first and second mounting segments of the first mounting member. The fourth coupler pivotally connects proximal end portions of the first and second mounting segments of the second mounting member. The first end portion of the connecting member is connected to or integrally formed with the third coupler and the second end portion of the connecting member is connected to or integrally formed with the fourth coupler.

In some exemplary embodiments, a respective leg assembly in the first and second leg assemblies includes a first leg, a second leg, and a lateral bar that is disposed between the first and second legs and connected to or integrally formed with the first and second legs. A corresponding supporting assembly in the first and second supporting assemblies is pivotally connected with the lateral bar of the respective leg assembly.

In various exemplary embodiments, the present disclosure provides a foldable frame including a mounting assembly, first and second leg assemblies, and first and second supporting assemblies. The first leg assembly is pivotally connected with the mounting assembly at a first side of the mounting assembly. The second leg assembly is pivotally connected with the mounting assembly at a second side of the mounting assembly. The first and second supporting assemblies are configured to control rotation of the first and second leg assemblies with respect to the mounting assembly. Each of the first and second supporting assemblies includes a first member, a controller and a second member. The first member is pivotally connected with a corresponding leg assembly in the first and second leg assemblies. The controller is connected with the first member and selectively movable along the first member. The second member has a first end portion pivotally connected with the controller and a second end portion pivotally connected with the mounting assembly. The second member of the first supporting assembly is integrally formed with the second member of the second supporting assembly as a unitary piece.

In some exemplary embodiments, each of the first and second supporting assemblies further includes a third member having a first end portion pivotally connected with the controller and a second end portion pivotally connected with the mounting assembly. The third member of the first supporting assembly is integrally formed with the third member of the second supporting assembly as another unitary piece.

In some exemplary embodiments, the mounting assembly includes a first mounting member, a second mounting member spaced apart from the first mounting member, and a connecting member disposed between the first and second mounting members. The connecting member has a first end portion connected to or integrally formed with the first mounting member and a second end portion connected to or integrally formed with the second mounting member. The second members of the first and second supporting assemblies are rotatably connected with the connecting member of the mounting assembly through a hole formed in the unitary piece.

In various exemplary embodiments, the present disclosure provides a foldable frame including a mounting assembly, first and second leg assemblies, one or more first couplers, and one or more second couplers. The mounting assembly includes a plurality of mounting members connected to or integrally formed with each other. The plurality of mounting members includes first, second, third and fourth mounting members. The first and second mounting members are spaced apart in a first direction, and the third and fourth mounting members are spaced apart in a second direction that is different than the first different. Each of the first and second leg assemblies includes one or more legs. The one or more first couplers are disposed at the third mounting member and configured to pivotally connect the one or more legs of the first leg assembly with the third mounting member. The one or more second couplers are disposed at the fourth mounting members and configured to pivotally connect the one or more legs of the second leg assembly with the fourth mounting member. The first and second leg assemblies are offset with respect to each other in the first direction such that the first and second leg assemblies are folded into an interior defined by the mounting assembly and are substantially on a same plane as the mounting assembly.

In some exemplary embodiments, each of the first and second couplers includes an interference piece. The interference piece of each first coupler extends toward the fourth mounting member and abuts a corresponding leg in the one or more legs of the first leg assembly when the first leg assembly is unfolded. The interference piece of each second coupler extends toward the third mounting member and abuts a corresponding leg in the one or more legs of the second leg assembly when the second leg assembly is unfolded. The abutting of the interference pieces against the legs of the first and second leg assemblies assist in stabilizing the foldable frame.

In an exemplary embodiment, each of the first and second couplers further includes one or more lugs. Each of the one or more lugs of each first coupler extends toward the fourth mounting member and each of the one or more lugs of each second coupler extends toward the third mounting member. The corresponding leg of the first or second leg assembly is pivotally coupled with the one or more lugs of the first or second coupler by a fastener through openings formed at the one or more lugs and at the corresponding leg.

In some exemplary embodiments, the foldable frame further includes a plurality of supporting assemblies to control rotation of the first and second leg assemblies with respect to the mounting assembly. Each respective supporting assembly in the plurality of supporting assemblies includes a slider and a supporting member. The slider is disposed at a corresponding leg in the one or more legs of the first or second leg assembly and selectively slidable along the corresponding leg. The supporting member has a first end portion pivotally coupled with the slider and a second end portion pivotally coupled with the first or second mounting member of the mounting assembly.

The supporting assemblies and frames of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

BRIEF DESCRIPTION OF THE DRAWINGS

The accompanying drawings, which are incorporated into and constitute a part of this specification, illustrate one or more exemplary embodiments of the present disclosure and, together with the Detailed Description, serve to explain the principles and implementations of exemplary embodiments of the invention.

Figure 1A:
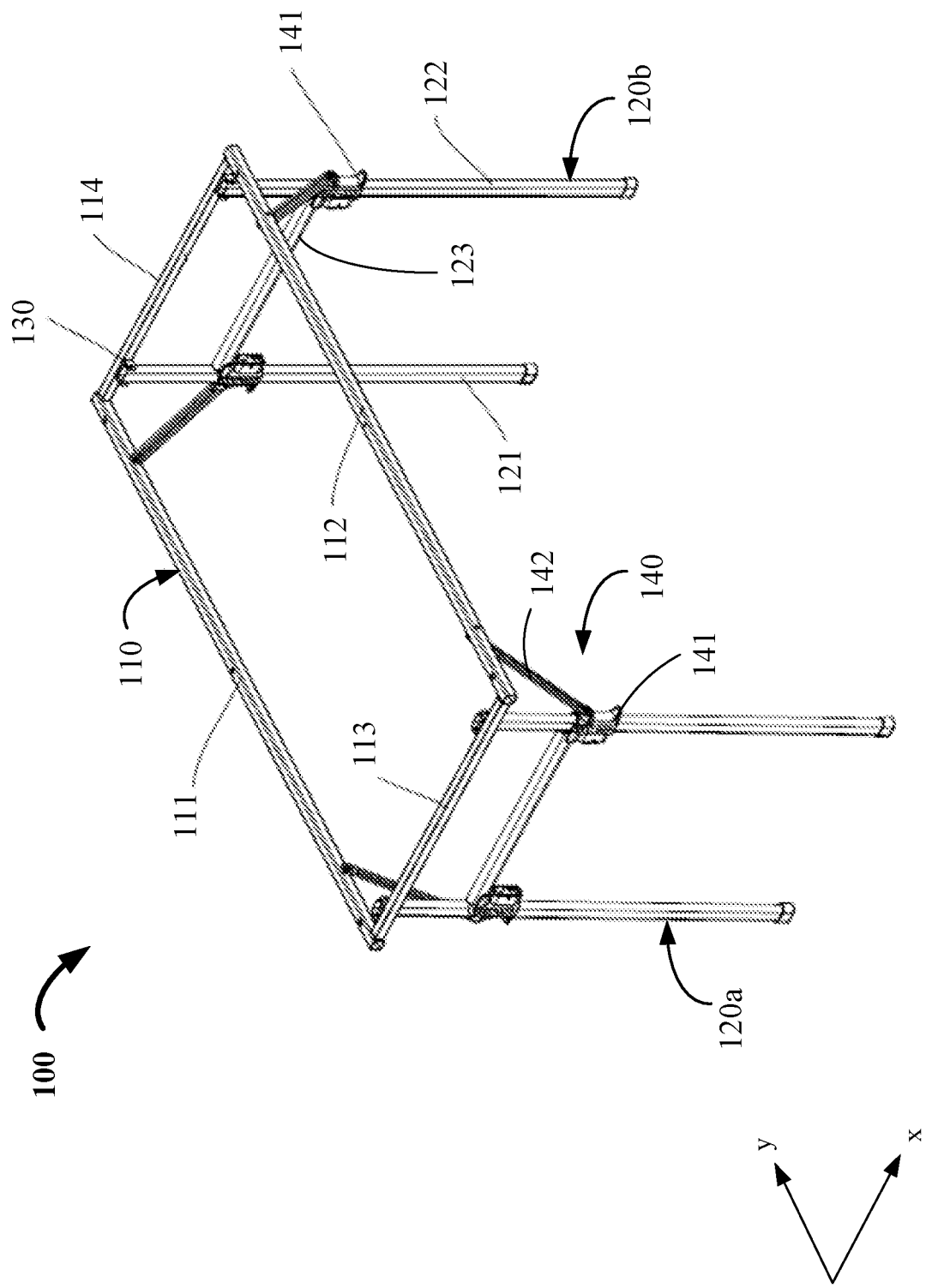
FIG. 1A is a perspective view illustrating an exemplary foldable frame in an unfolded state in accordance with exemplary embodiments of the present disclosure.

As will be apparent to those of skill in the art, the components illustrated in the figures described herein are combinable in any useful number and combination. The figures are intended to be illustrative in nature and are not limiting.

DETAILED DESCRIPTION

Reference will now be made in detail to implementation of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present invention are described in the context of foldable frames. The frames can be used to make benches, tables, beds or the like. The frames are of various sizes and of various shapes including but not limited to rectangles and squares. In addition, the frames can be made of various materials including but not limited to metals (e.g., iron, steel, and aluminum), plastics and woods. In some exemplary embodiments, some components of a frame (e.g., bars) are made of metals or the like while some other components (e.g., controllers) are made of plastics, rubbers or the like.

A frame of the present disclosure generally includes a mounting assembly having a plurality of mounting members connected to or integrally formed with each other. The mounting assembly defines an interior and a plane. A frame of the present disclosure also includes first and second leg assemblies pivotally connected with the mounting assembly at first and second sides of the mounting assembly, respectively. The first and second leg assemblies are foldable into the interior defined by the mounting assembly and, when folded, are substantially on the same plane as the mounting assembly. In some exemplary embodiments, a frame of the present disclosure further includes one or more supporting assemblies to control rotation of the first and second leg assemblies, to stabilize the first and second assemblies when the frame is unfolded, and/or to help support the mounting assembly when the frame is unfolded. As such, the frame of the present disclosure is stable when in use and is compact when folded.

Referring now to FIGS. 1A-1E, there is depicted exemplary foldable frame 100 in accordance with various exemplary embodiments of the present disclosure. Frame 100 includes a mounting assembly such as mounting assembly 110. In some exemplary embodiments, the mounting assembly includes a plurality of mounting members connected to or integrally formed with each other. As such, the mounting assembly defines an interior and a plane. In an exemplary embodiment, the mounting assembly is formed as a unitary piece. For instance, in some exemplary embodiments, mounting assembly 110 includes first mounting member 111, second mounting member 112, third mounting member 113 and fourth mounting member 114. The first and second mounting members are spaced apart in a first direction, and the third and fourth mounting members are spaced apart in a second direction, e.g., the x and y directions in FIG. 1. The second direction is different than the first direction. In some exemplary embodiments, the second direction is substantially perpendicular to the first direction. In an exemplary embodiment, the first, second, third and fourth mounting members are connected with each other at their adjacent end portions. In another exemplary embodiment, the mounting assembly includes at least one additional mounting member disposed, for instance, between the first and third mounting members or between the second and fourth mounting members.

Frame 100 also includes a first leg assembly such as first leg assembly 120a and a second leg assembly such as second leg assembly 120b. The first and second leg assemblies can be but do not necessarily have to be identical or symmetrical with respect to each other. By way of example, first leg assembly 120a and second leg assembly 120b are illustrated to be substantially identical. In some exemplary embodiments, each of the first and second leg assemblies includes one or more legs. For instance, by way of example, FIG. 1A illustrates each of the first and second leg assemblies including a first leg, such as first leg 121, and a second leg, such as second leg 122. In some exemplary embodiments, each of the first and second leg assemblies includes a lateral bar such as lateral bar 123. The lateral bar is disposed between the first and second legs and connected to or integrally formed with the first and second legs.

The first and second leg assemblies are pivotally connected with the mounting assembly at first and second sides of the mounting assembly, respectively. In some exemplary embodiments, the first leg assembly is pivotally connected with the third mounting member by one or more first couplers disposed at the third mounting member and the second leg assembly is pivotally connected with the fourth mounting member by one or more second couplers disposed at the fourth mounting member. The first and second couplers can be the same as or different from each other. For instance, by way of example, FIG. 1A illustrates two couplers 130 for pivotally connecting the first and second legs of the first leg assembly with the third mounting member and two couplers 130 for pivotally connecting the first and second legs of the second leg assembly with the fourth mounting member.

Figure 1B:
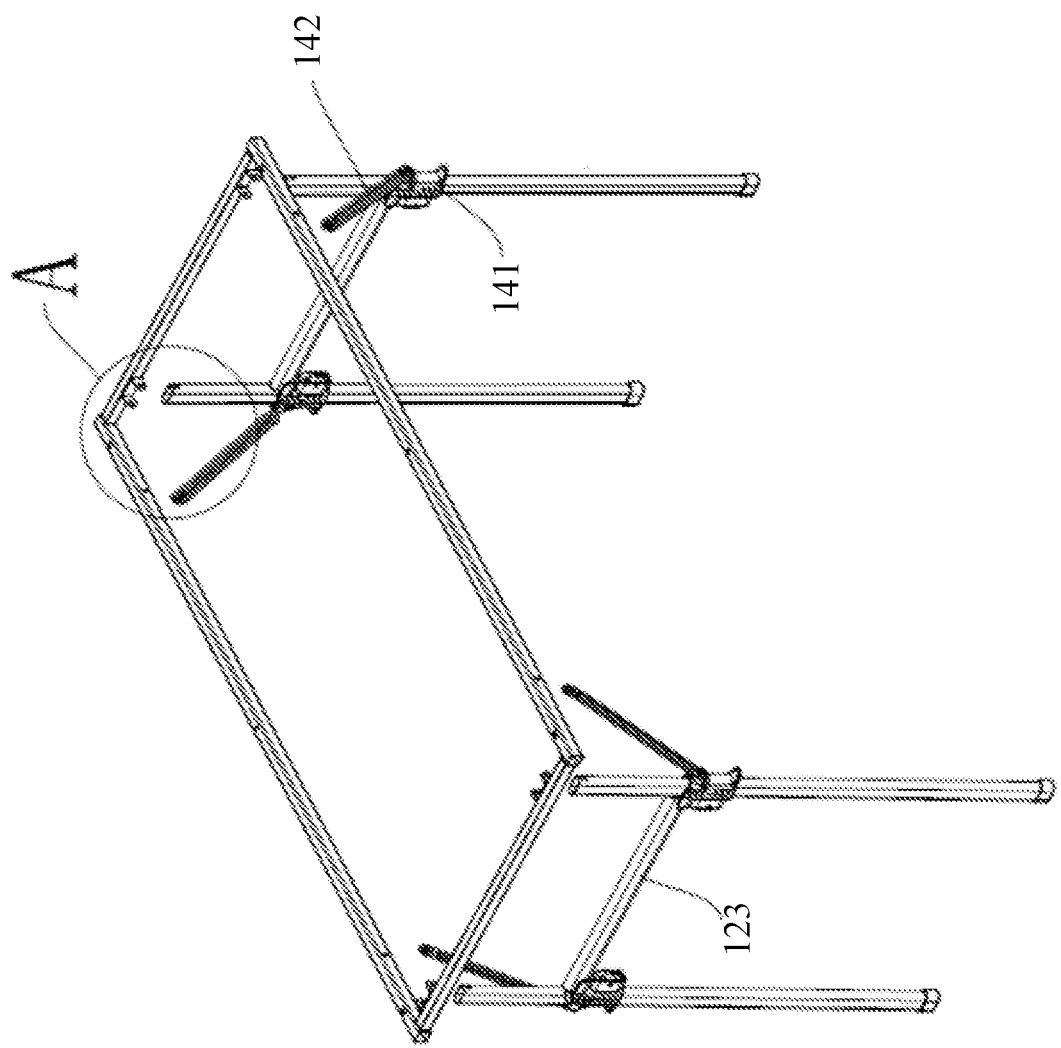
FIG. 1B is a partially disassembled view illustrating the foldable frame of FIG. 1A in accordance with exemplary embodiments of the present disclosure.
Figure 1C:
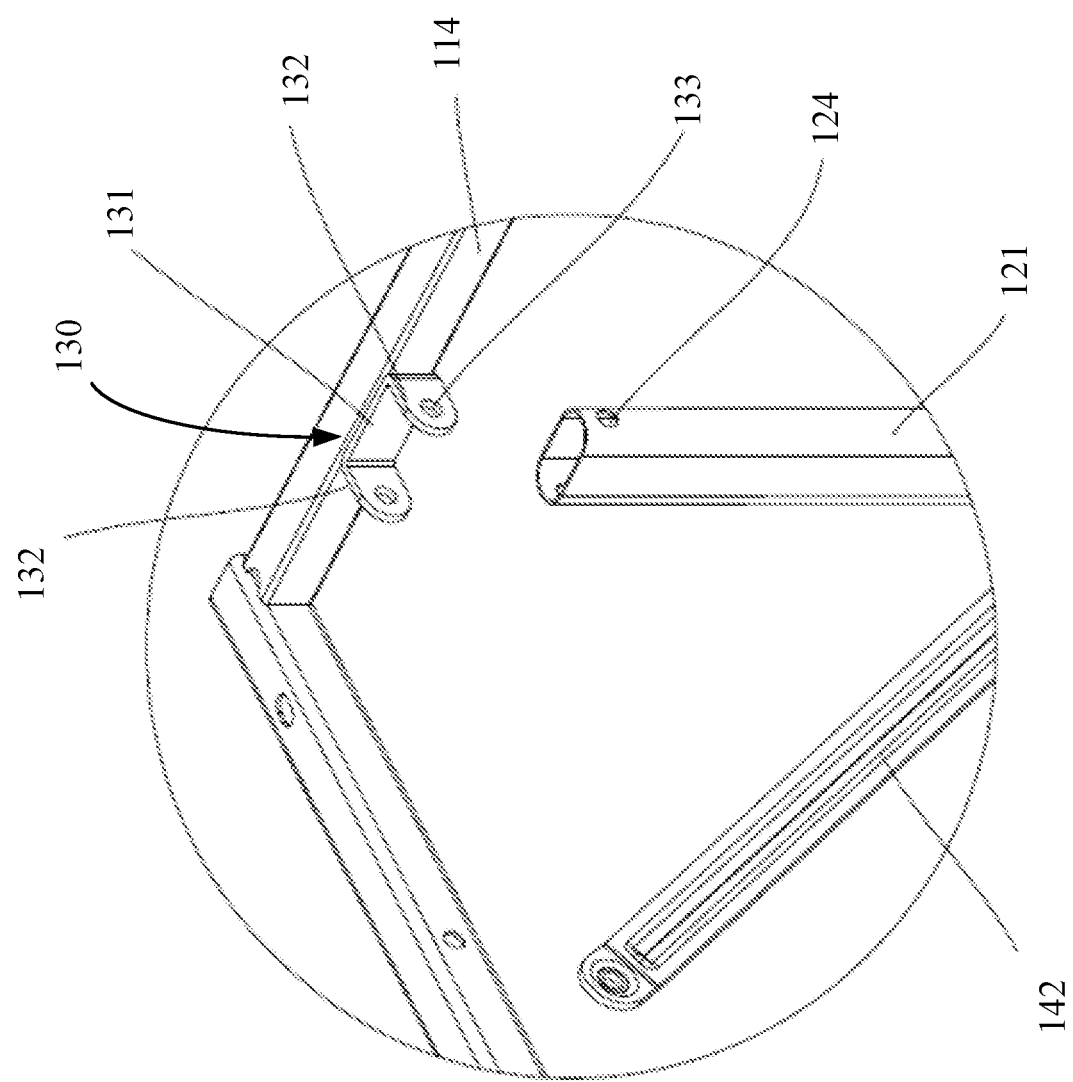
FIG. 1C is an enlarged view illustrating taken along circle A of FIG. 1B.
Figure 1D:
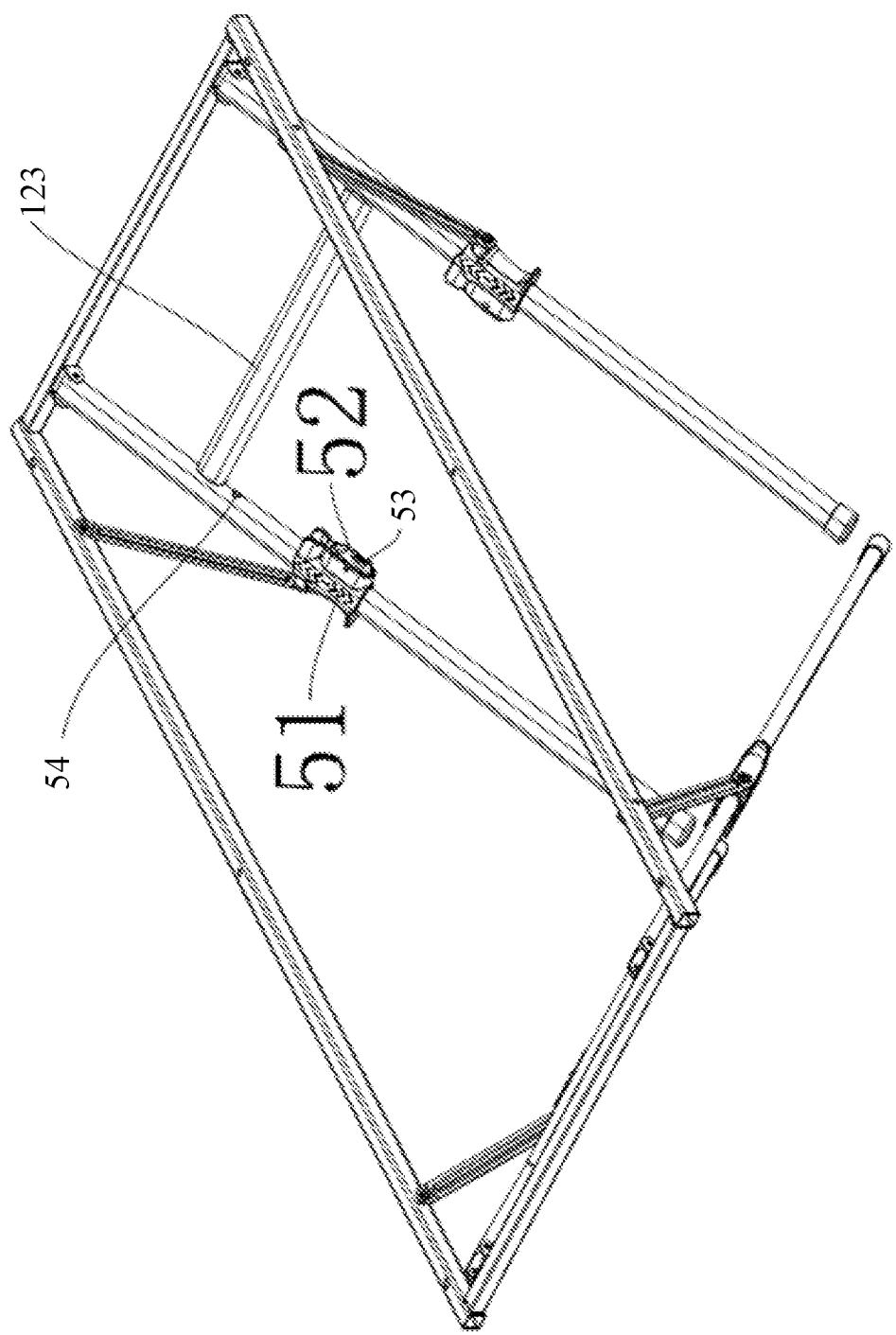
FIG. 1D is a perspective view illustrating the foldable frame of FIG. 1A in an intermediate state in accordance with exemplary embodiments of the present disclosure.

Referring in particular to FIGS. 1B and 1C, in some exemplary embodiments, coupler 130 includes a body segment such as body segment 131 and one or more lugs, such as lug 132. The body segment is fixedly connected to or integrally formed with the third or fourth mounting member. In an exemplary embodiment, the body segment is fixedly connected to or integrally formed at an interior side of the third or fourth mounting member. The one or more lugs of coupler 130 disposed at the third mounting member extend toward the fourth mounting member, and the one or more lugs of coupler 130 disposed at the fourth mounting extends toward the third mounting member. In an exemplary embodiment, lug 132 is formed with an opening such as opening 133, and the first or second leg is formed with an opening such as opening 124. The first or second leg of the first or second leg assembly is pivotally coupled with the one or more lugs of the first or second coupler by a fastener through the openings formed at the one or more lugs and at the corresponding leg. Exemplary fasteners include a screw, a bolt, or the like.

In some exemplary embodiments, frame 100 further includes a plurality of supporting assemblies such as supporting assembly 140 to control rotation of the first and second leg assemblies with respect to the mounting assembly. Supporting assembly 140 includes a slider, such as slider 141 and a supporting member, such as supporting member 142. The slider is disposed at a leg, e.g., the first or second leg of the first or second leg assembly, and selectively slidable along the corresponding leg. For instance, in some exemplary embodiments, slider 141 includes a sleeve, such as sleeve 51 configured to slidably couple with the leg. Slider 141 also includes a controlling assembly such as controlling assembly 52 configured to control movement of the sleeve along the leg. In an exemplary embodiment, controlling assembly 52 includes a button such as button 53, a pin and an elastic member. The pin is selectively pushed into hole 54 formed at the leg by the elastic member, thereby restricting the sleeve (and accordingly the slider) from moving along the leg. Pressing the button will remove the pin from the hole at the leg. This disengages the sleeve from the leg, and thus allows the sleeve (accordingly the slider) to move along the leg. Examples of such sliders are disclosed in U.S. patent application Ser. Nos. 16/838,939, 16/838,944 and 16/838,947, the disclosure of each application is incorporated herein for all purposes by reference in its entirety.

Figure 1E:
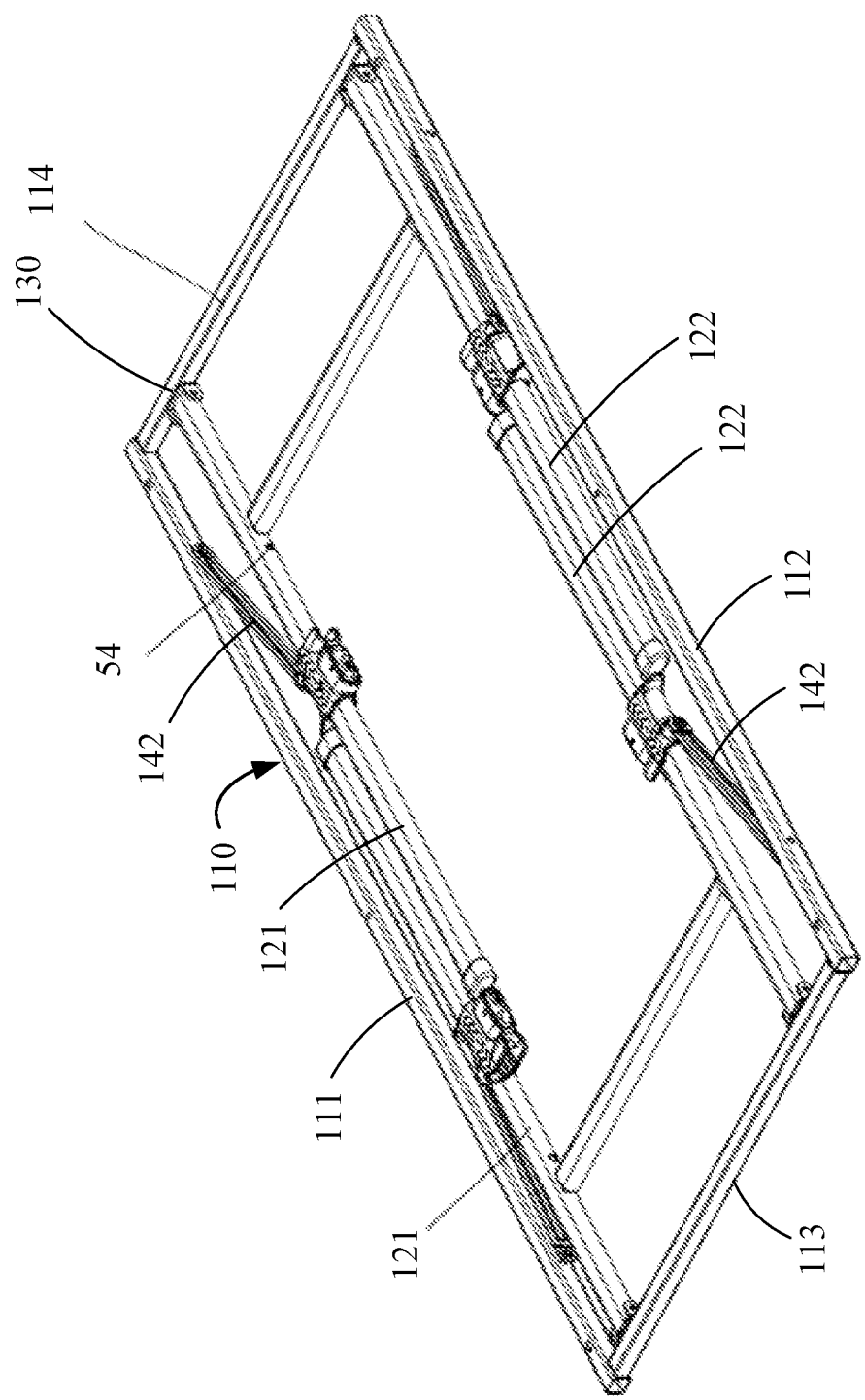
FIG. 1E is a perspective view illustrating the foldable frame of FIG. 1A in a folded state in accordance with exemplary embodiments of the present disclosure.
Figure 2A:
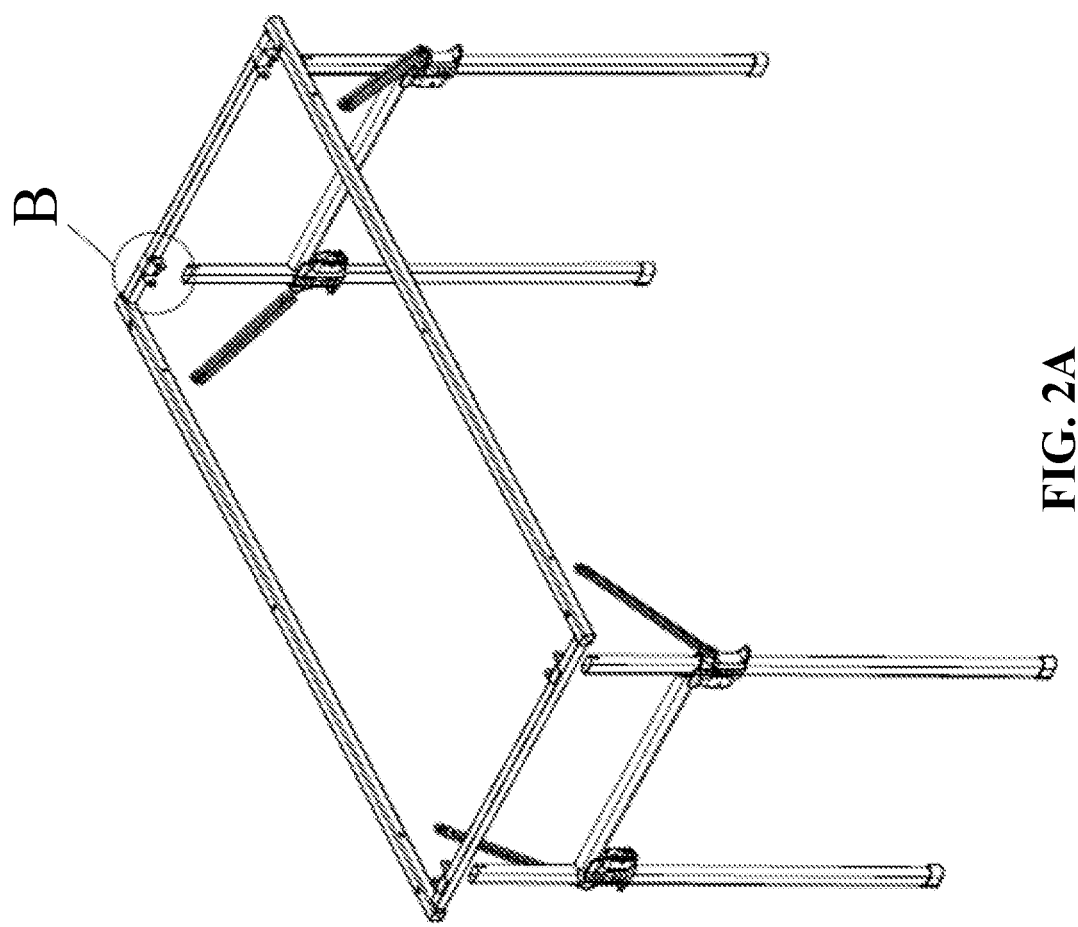
FIG. 2A is a partially disassembled view illustrating an exemplary foldable frame in accordance with exemplary embodiments of the present disclosure.
Figure 2B:
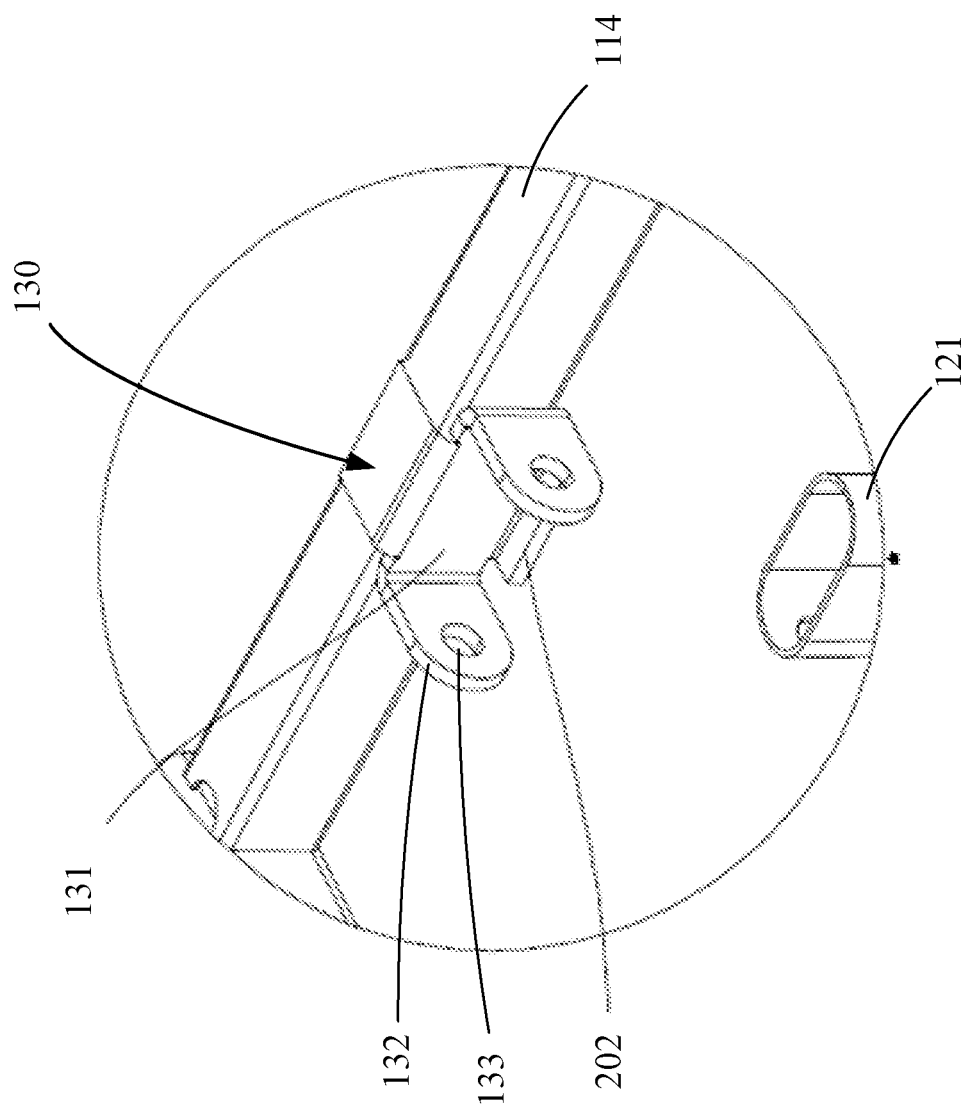
FIG. 2B is an enlarged view illustrating taken along circle B of FIG. 2A.
Figure 2C:
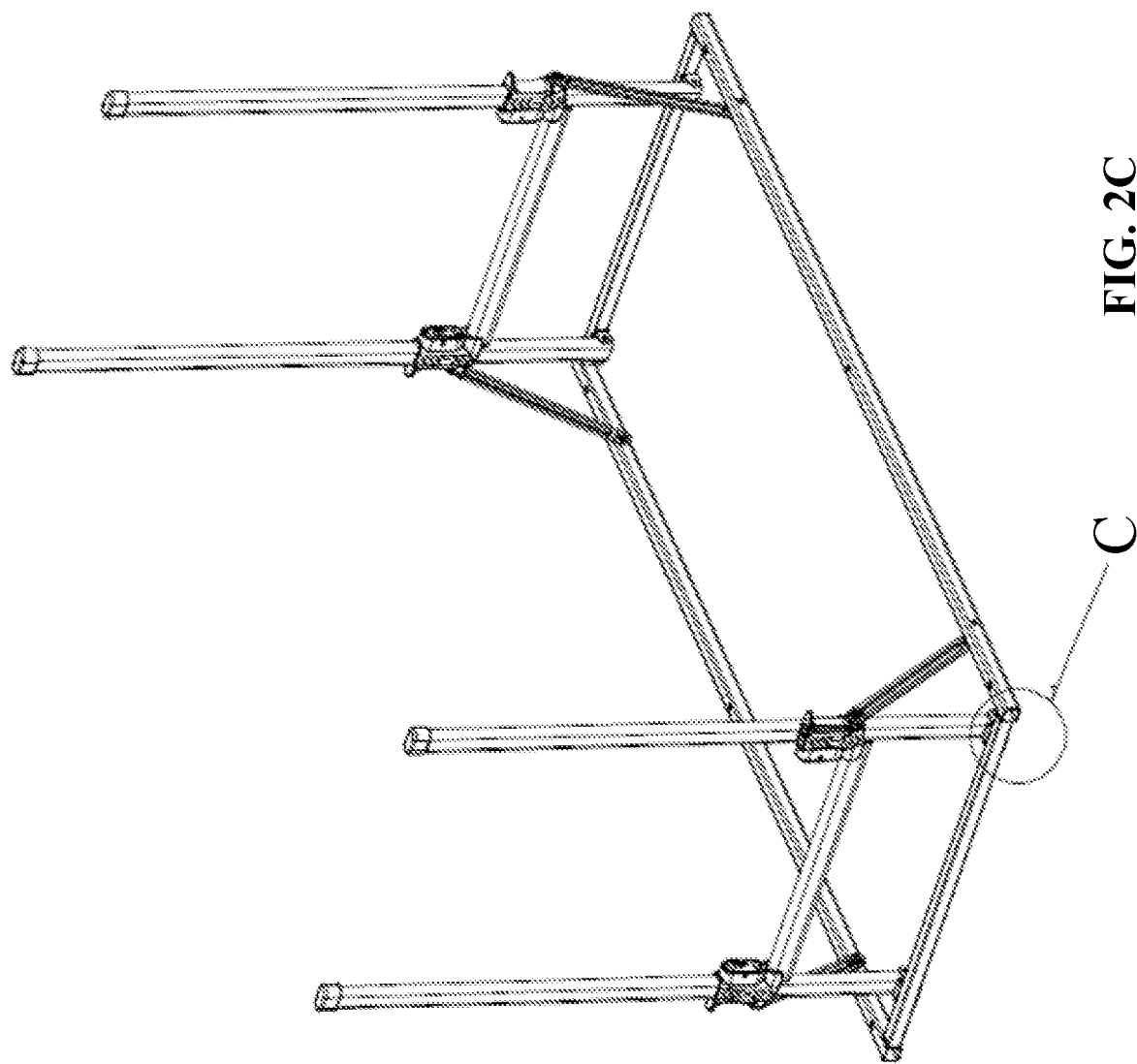
FIG. 2C is a bottom perspective view illustrating the foldable frame of FIG. 2A in accordance with exemplary embodiments of the present disclosure.
Figure 2D:
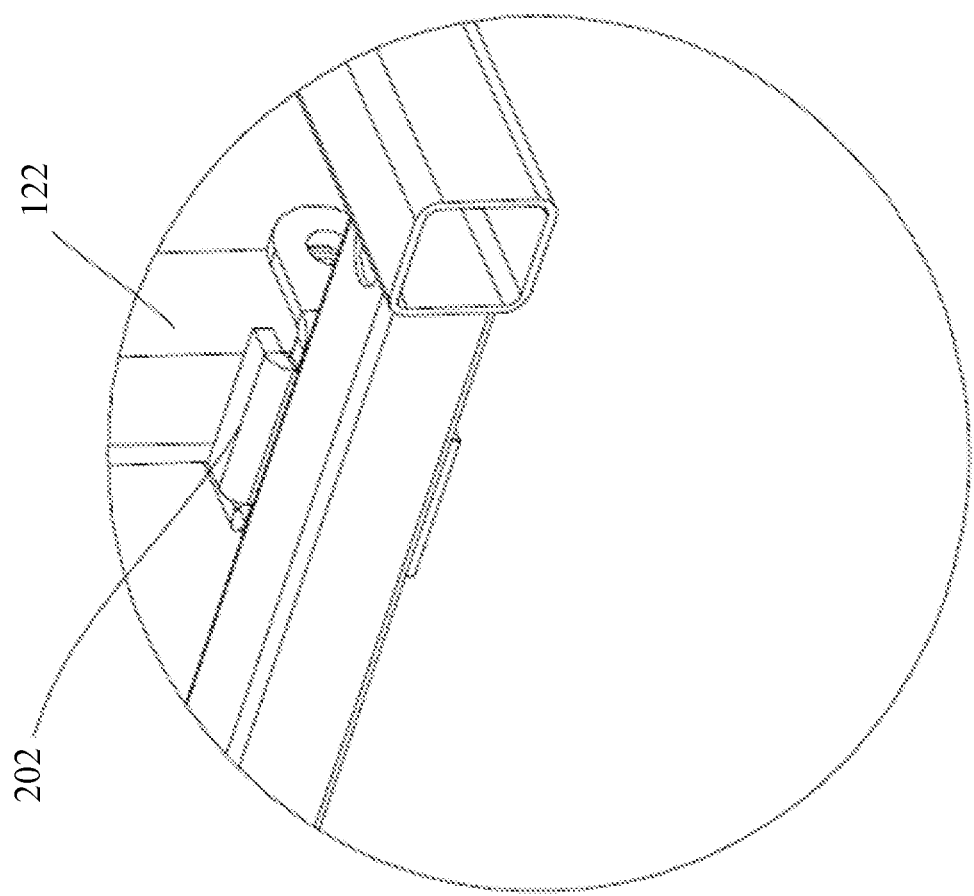
FIG. 2D is an enlarged view illustrating taken along circle C of FIG. 2C.

Supporting member 142 has a first end portion pivotally coupled with the slider and a second end portion pivotally coupled with the first or second mounting member of the mounting assembly. In some exemplary embodiments, the second end portion of supporting member 142 is pivotally coupled with the interior side of the first or second mounting member as illustrated in FIG. 1E. Such pivotal connections, together with couplers 130, allow the first and second leg assemblies, as well as the supporting assemblies, to fold into the interior defined by mounting assembly 110. When folded, the first and second leg assemblies (and/or the supporting assemblies) are disposed on a plane defined by the mounting assembly, e.g., substantially on the same plane as the mounting assembly. This results in a very compact folded frame. If the mounting assembly is coupled with a table panel, the first and second leg assemblies will fold onto the table panel and will not take up any unnecessary spaces. Thus, the frames and tables when folded are compact and convenient to use. In some exemplary embodiments (e.g., when the combined length of first legs 121 of the first and second leg assemblies is longer than the length of first mounting member 111), the first and second leg assemblies are offset with respect to each other in the first direction. The offset ensures the first and second leg assemblies folded into the interior defined by mounting assembly 110 and substantially on the same plane as the mounting assembly.

Referring to FIGS. 2A-2D, coupler 130 includes additional or optional features. For instance, in some exemplary embodiments, coupler 130 further includes an interference piece such as interference piece 202. The interference piece can be made, for instance, by bending a portion of the coupler. The interference piece of coupler 130 disposed at the third mounting member extends toward the fourth mounting member, and abuts a leg (e.g., the first or second leg) of the first leg assembly when the first leg assembly is unfolded. Similarly, the interference piece of coupler 130 disposed at the fourth mounting extends toward the third mounting member, and abuts a leg of the second leg assembly when the second leg assembly is unfolded. Thus, the interference pieces of the couplers assist in stabilizing the foldable frame when unfolded and in use.

Referring to FIGS. 3A-3D, there is depicted exemplary foldable frame 300 in accordance with some exemplary embodiments of the present disclosure. Frame 300 includes a mounting assembly such as mounting assembly 310. Like mounting assembly 110, in some exemplary embodiments, mounting assembly 310 includes a plurality of mounting members connected to or integrally formed with each other. For instance, in some exemplary embodiments, mounting assembly 310 includes first mounting member 111, second mounting member 112, third mounting member 113 and fourth mounting member 114. In some exemplary embodiments, mounting assembly 310 further includes a connecting member such as connecting member 311. The connecting member is disposed between the first and second mounting members. In an exemplary embodiment, the connecting member has a first end portion connected to or integrally formed with the first mounting member and a second end portion connected to or integrally formed with the second mounting member.

Frame 300 also includes a first leg assembly, such as first leg assembly 120a and a second leg assembly such as second leg assembly 120b. The first and second leg assemblies are pivotally connected with the mounting assembly at first and second sides of the mounting assembly by couplers 330. Coupler 330 can be configured the same or similar to coupler 130.

Figure 3A:
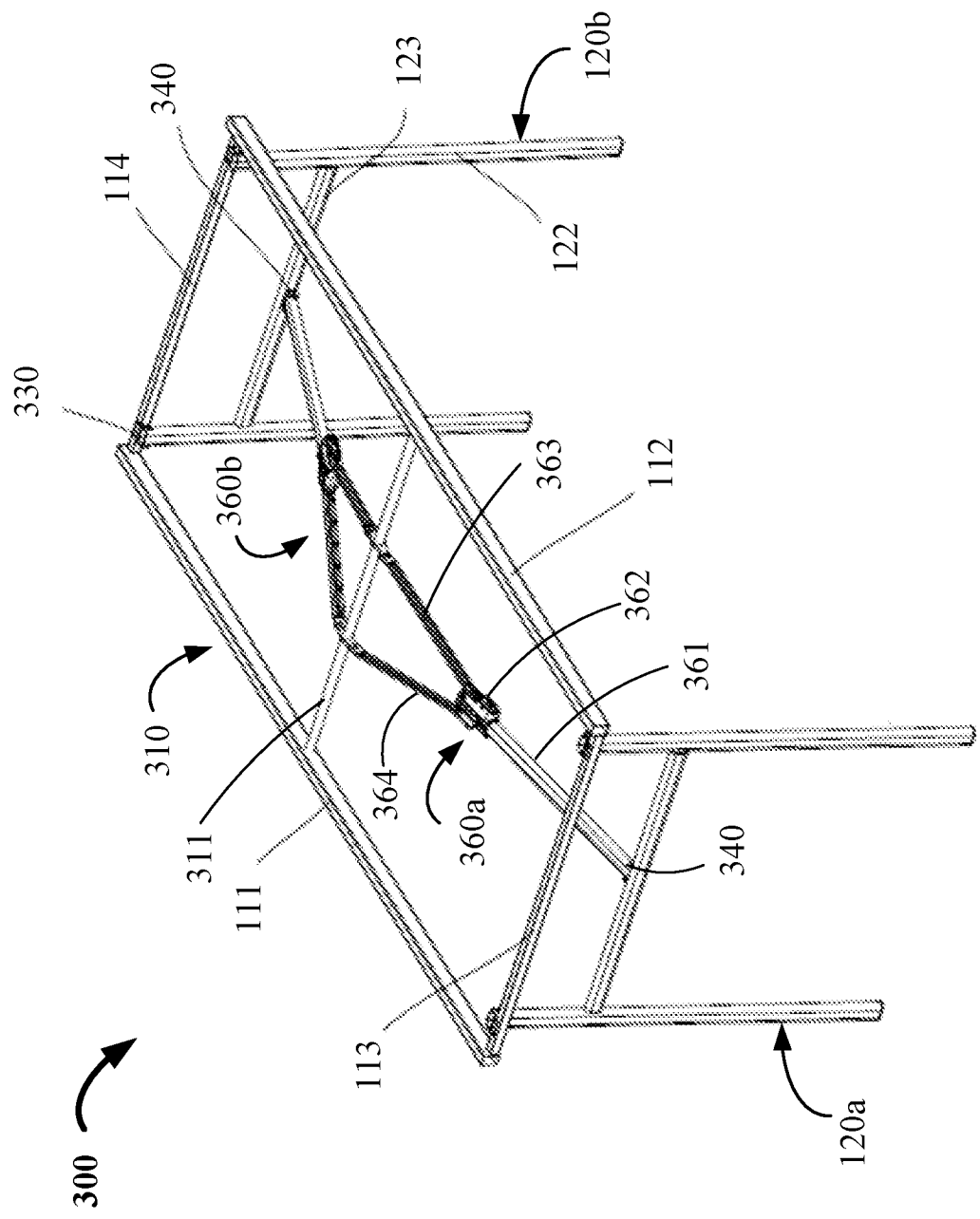
FIG. 3A is a perspective view illustrating an exemplary foldable frame in an unfolded state in accordance with exemplary embodiments of the present disclosure.
Figure 3B:
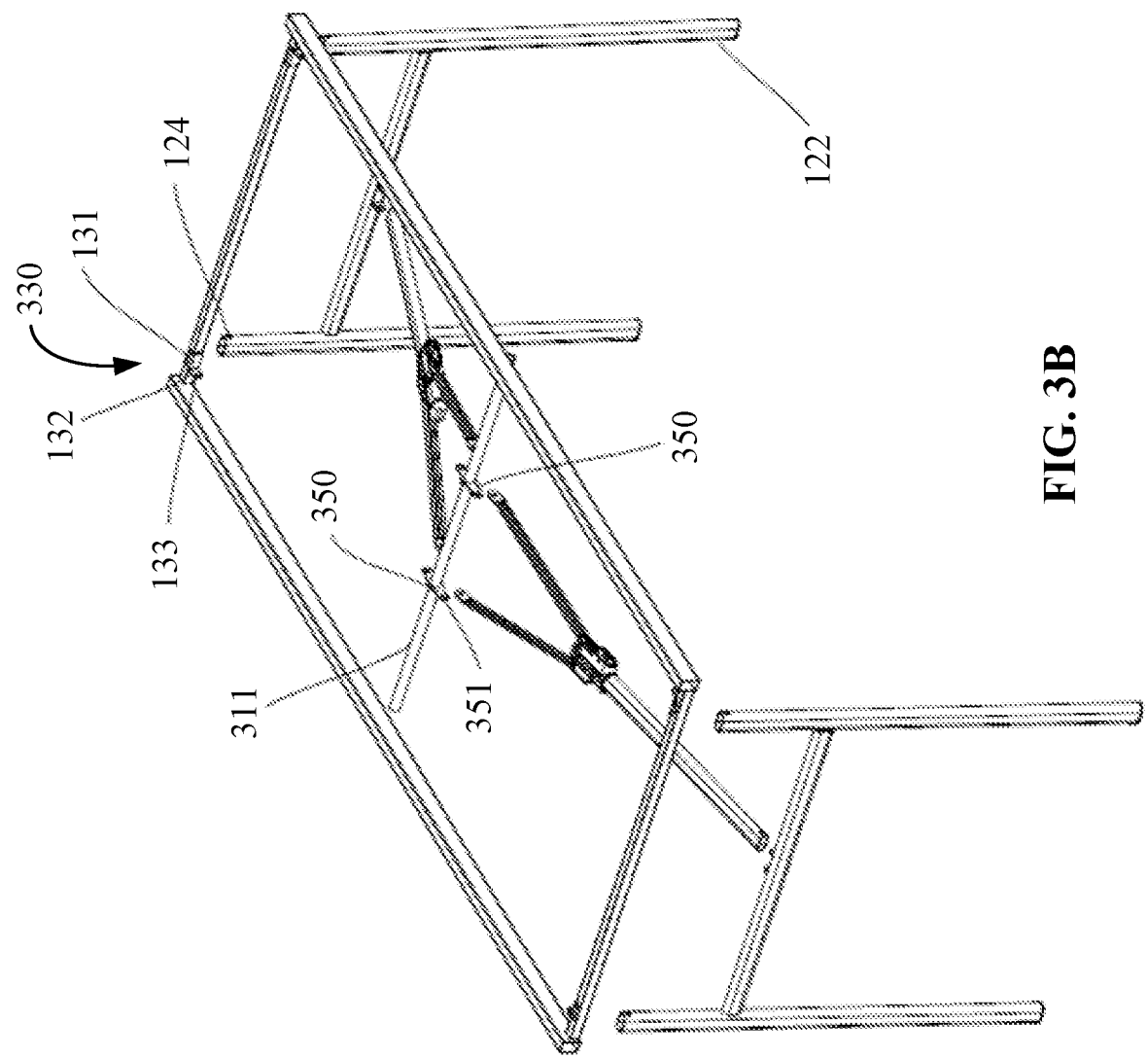
FIG. 3B is a partially disassembled view illustrating the foldable frame of FIG. 3A in accordance with exemplary embodiments of the present disclosure.
Figure 3C:
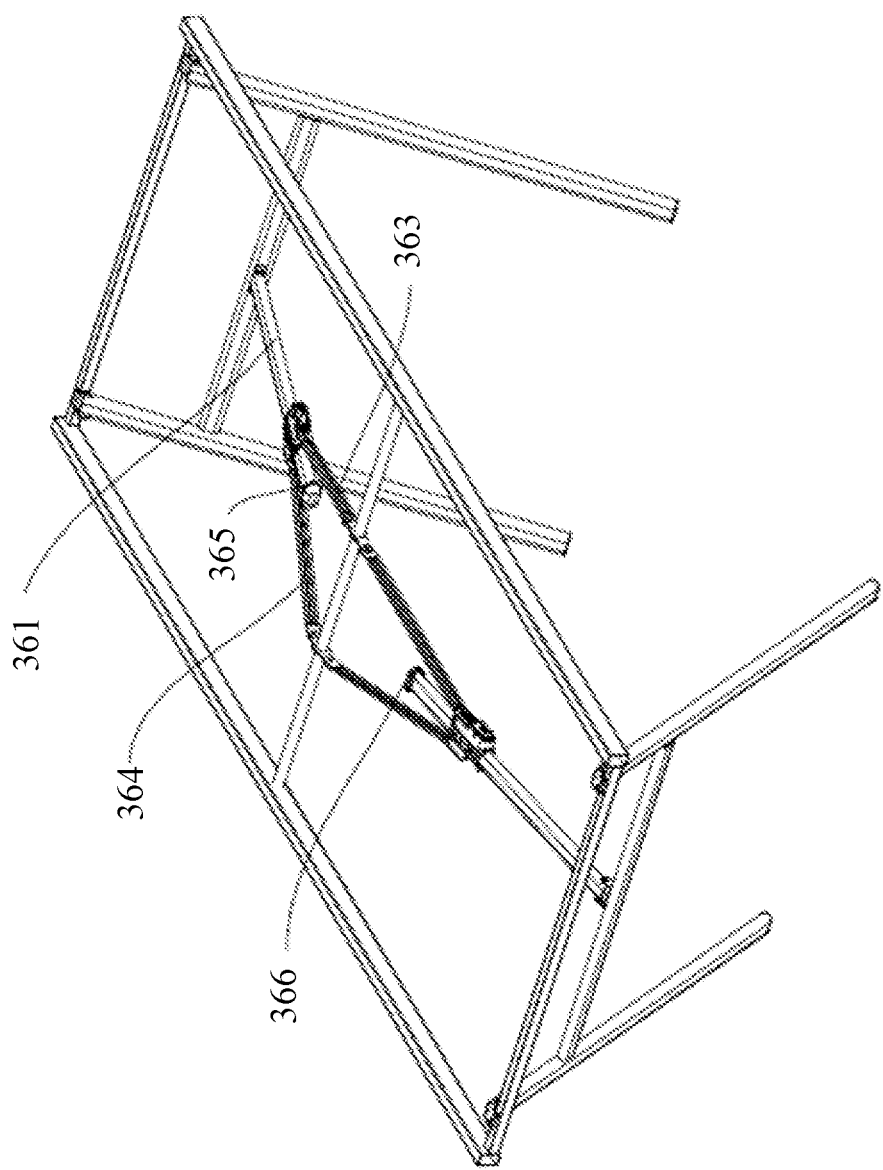
FIG. 3C is a perspective view illustrating the foldable frame of FIG. 3A in an intermediate state in accordance with exemplary embodiments of the present disclosure.

In some exemplary embodiments, frame 300 further includes a plurality of supporting assemblies to control rotation of the first and second leg assemblies with respect to the mounting assembly, to stabilize the first and second leg assemblies when unfolded, to help support the mounting assembly, or any combination thereof. For instance, by way of example, FIG. 3A illustrates first supporting assembly 360a and second supporting assembly 360b. The first and second supporting assemblies can be the same as or different from each other. In some exemplary embodiments, the first supporting assembly is pivotally connected with the first leg assembly and the second supporting assembly is pivotally connected with the second leg assembly, for instance, by a coupler such as coupler 340. Coupler 340 can be configured similarly as coupler 130.

Each of the first and second leg assemblies is also pivotally connected with the connecting member of the mounting assembly. For instance, in some exemplary embodiments, the first or second supporting assembly includes a first member such as first member 361 pivotally connected with the first or second assembly, e.g., by coupler 340. The first or second supporting assembly also includes a controller such as controller 362 connected with the first member and selectively movable along the first member. In some exemplary embodiments, controller 362 is configured to be a slider or to include a slider similar to those disclosed in U.S. patent application Ser. Nos. 16/838,939, 16/838,944, 16/838,947, and 16/951,461, the disclosure of each application is incorporated herein for all purposes by reference in its entirety. In an exemplary embodiment, controller 362 includes a pin and an elastic member. The elastic member pushes the pin into a hole such as hole 365 formed at first member 361, thereby restricting the controller from moving along the first member. Pressing the elastic member will remove the pin from the hole at the first member, thereby allowing the controller to move along the first member. In some exemplary embodiments, a stopper such as stopper 366 is disposed at an end portion of the first member that is adjacent to the second member, and configured to prevent complete disengagement of controller 362 from the first member.

The first or second supporting assembly further includes one or more additional members. For instance, in an exemplary embodiment, the first or second supporting assembly includes a second member such as second member 363 having a first end portion pivotally connected with the controller and a second end portion pivotally connected with the connecting member of the mounting assembly. In another exemplary embodiment, the first or second supporting assembly includes the second member and a third member such as third member 364. Like the second member, the third member has a first end portion pivotally connected with the controller and a second end portion pivotally connected with the connecting member of the mounting assembly. In an exemplary embodiment, the second and third members are disposed symmetrically with respect to each other, and the first, second and third members form a general "Y" shape.

In some exemplary embodiments, the second or third member is pivotally connected with the connecting member by a coupler such as coupler 350. In an exemplary embodiment, coupler 350 is fixedly coupled or integrally formed with connecting member 311. Coupler 350 is formed with coupling element (e.g., an opening, a rivet, fastener, or the like) such as coupling element 351 at each side of the connecting member. One coupling element is configured to pivotally connect with the second or third member of the first supporting assembly and the other opening is configured to pivotally connect with the second or third member of the second supporting assembly.

Figure 3D:
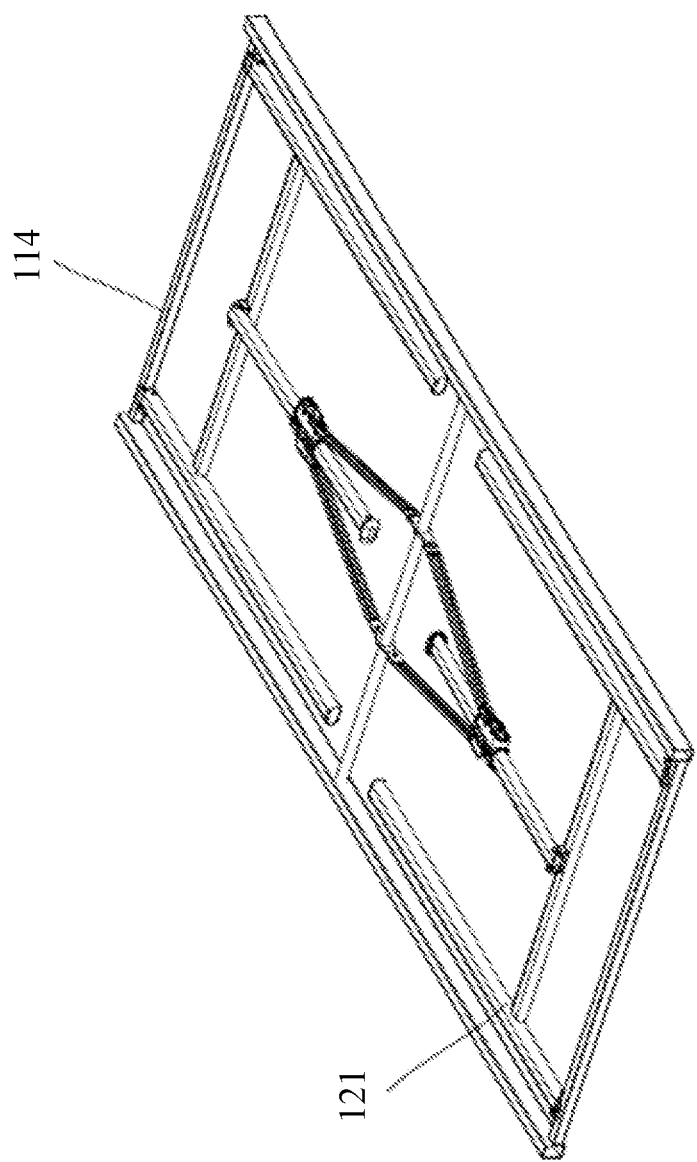
FIG. 3D is a perspective view illustrating the foldable frame of FIG. 3A in a folded state in accordance with exemplary embodiments of the present disclosure.

First supporting assembly 360a is configured to control the rotation of first leg assembly 120a with respect to the mounting assembly and, when the frame is unfolded, to stabilize first leg assembly 120a and help support the mounting assembly. Similarly, second supporting assembly 360b is configured to control the rotation of second leg assembly 120b with respect to the mounting assembly and, when the frame is unfolded, to stabilize second leg assembly 120b and help support the mounting assembly. For instance, as the controller moves along the length direction of the first member, the second and third members move toward or away from the first member, resulting in shortening or lengthening the total length of the first or second supporting assembly. In the meantime, each of the first, second and third supporting members rotates. For instance, the first member rotates around the pivoting axis at which the first member is pivotally connected with the first or second leg assembly. The second member rotates around the pivoting axis at which the second member is pivotally connected with the controller, and rotates around the pivoting axis at which the second member is pivotally connected with the connecting member. The third member rotates around the pivoting axis at which the third member is pivotally connected with the controller, and rotates around the pivoting axis at which the third member is pivotally connected with the connecting member. As such, the first or second supporting assembly allows the first or second leg assembly to rotate between a use position as illustrated in FIG. 3A and a storage position as illustrated in FIG. 3D. When the first or second leg assembly is in the use position, the controller is restricted from moving along the first member (e.g., by a pin or the like), thereby preventing the first, second and third members from rotating and the total length of the supporting assembly from shortening or lengthening. As such, it prevents the leg assembly from accidental folding and thus helps stabilize the frame.

Referring in particular to FIG. 3D, when folded, the first and second leg assemblies, as well as the first and second supporting assemblies, are disposed in the interior defined by the mounting assembly. In some exemplary embodiments, they are disposed on a plane defined by the mounting assembly, e.g., substantially on the same plane as the mounting assembly. This results in a very compact folded frame. If the mounting assembly is coupled with a table panel, the first and second leg assemblies will fold onto the table panel and will not take up any unnecessary spaces. As such, the frames and tables when folded are compact and convenient to use.

Figure 4A:
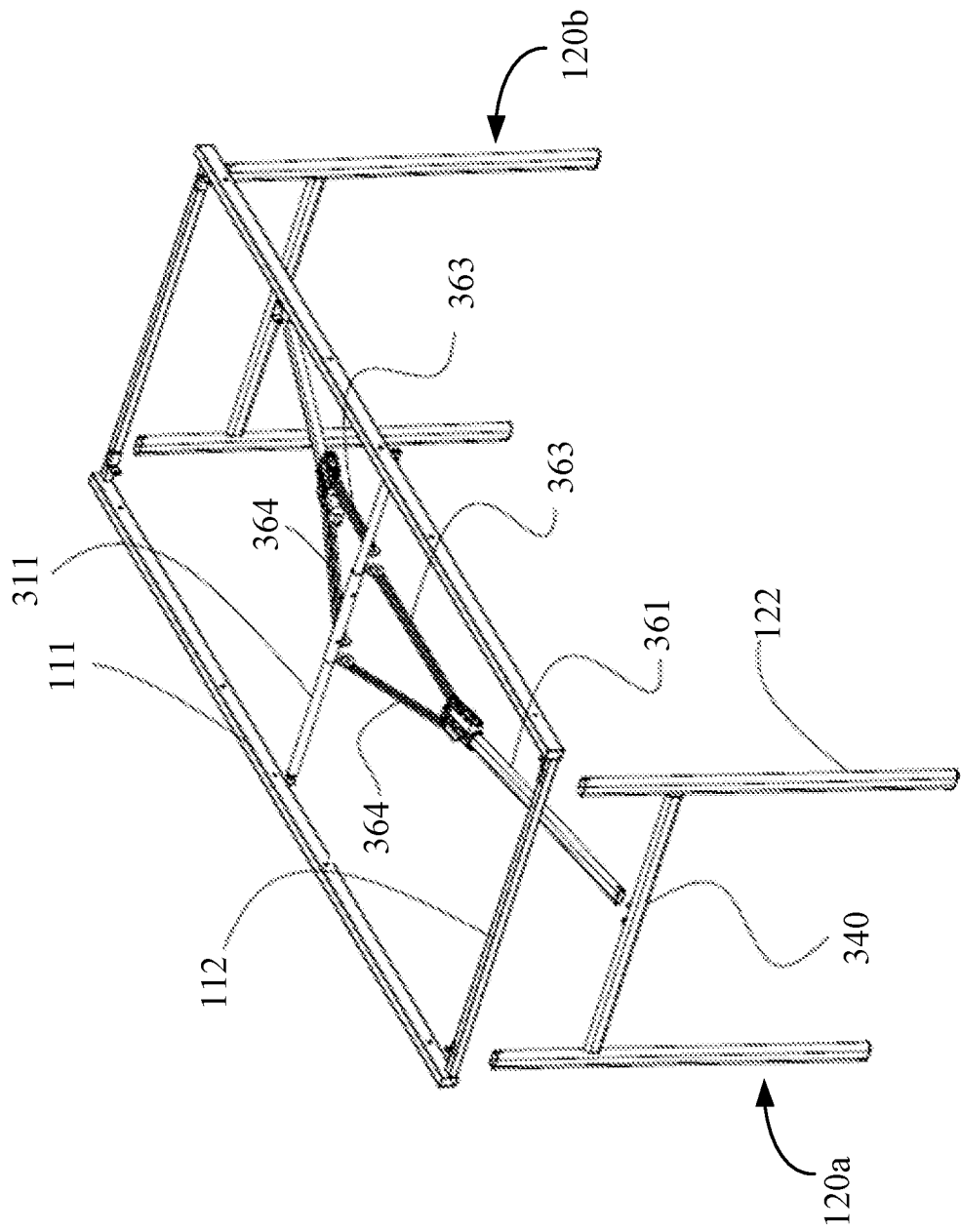
FIG. 4A is a partially disassembled view illustrating an exemplary foldable frame in accordance with exemplary embodiments of the present disclosure.
Figure 4B:
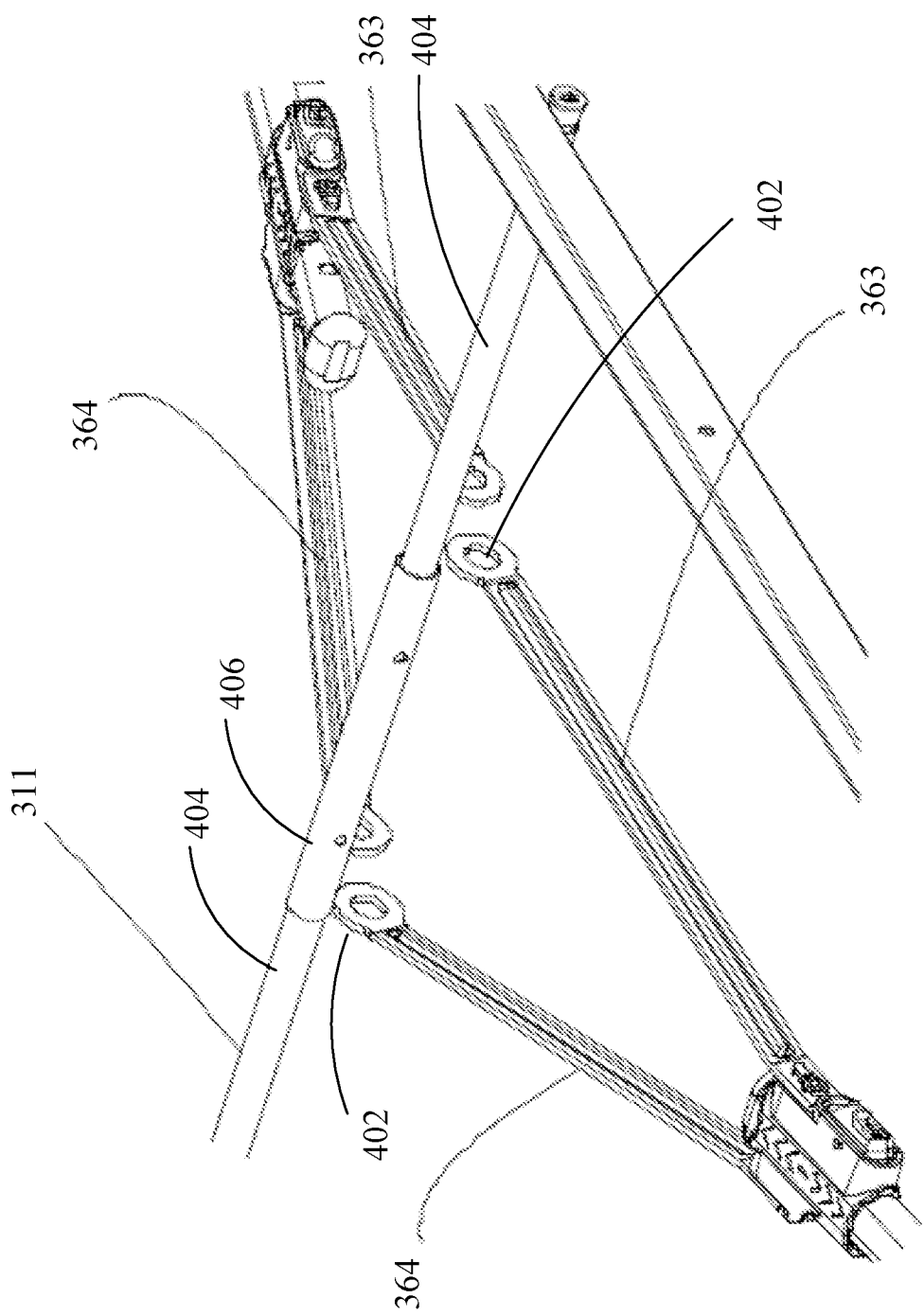
FIG. 4B is an enlarged view illustrating a portion of the exemplary foldable frame of FIG. 4A.

Referring to FIGS. 4A and 4B, in some exemplary embodiments, the second end portion of second member 363 or third member 364 is formed with a hole such as hole 402. The second or third member is rotatably connected with connecting member 311 of the mounting assembly by having the connecting member passing through hole 402 of the second or third member. In some exemplary embodiments, connecting member 311 includes one or more first segments such as first segment 404 and one or more second segments such as second segment 406. The second end portion of the second or third member is sleeved on first segment 404 through hole 402. In an exemplary embodiment, second segment 406 is larger crosswise than first segment 404 and serves as a stopper to limit movement of the second end portion of the second or third member along the connecting member of the mounting assembly.

Figure 5A:
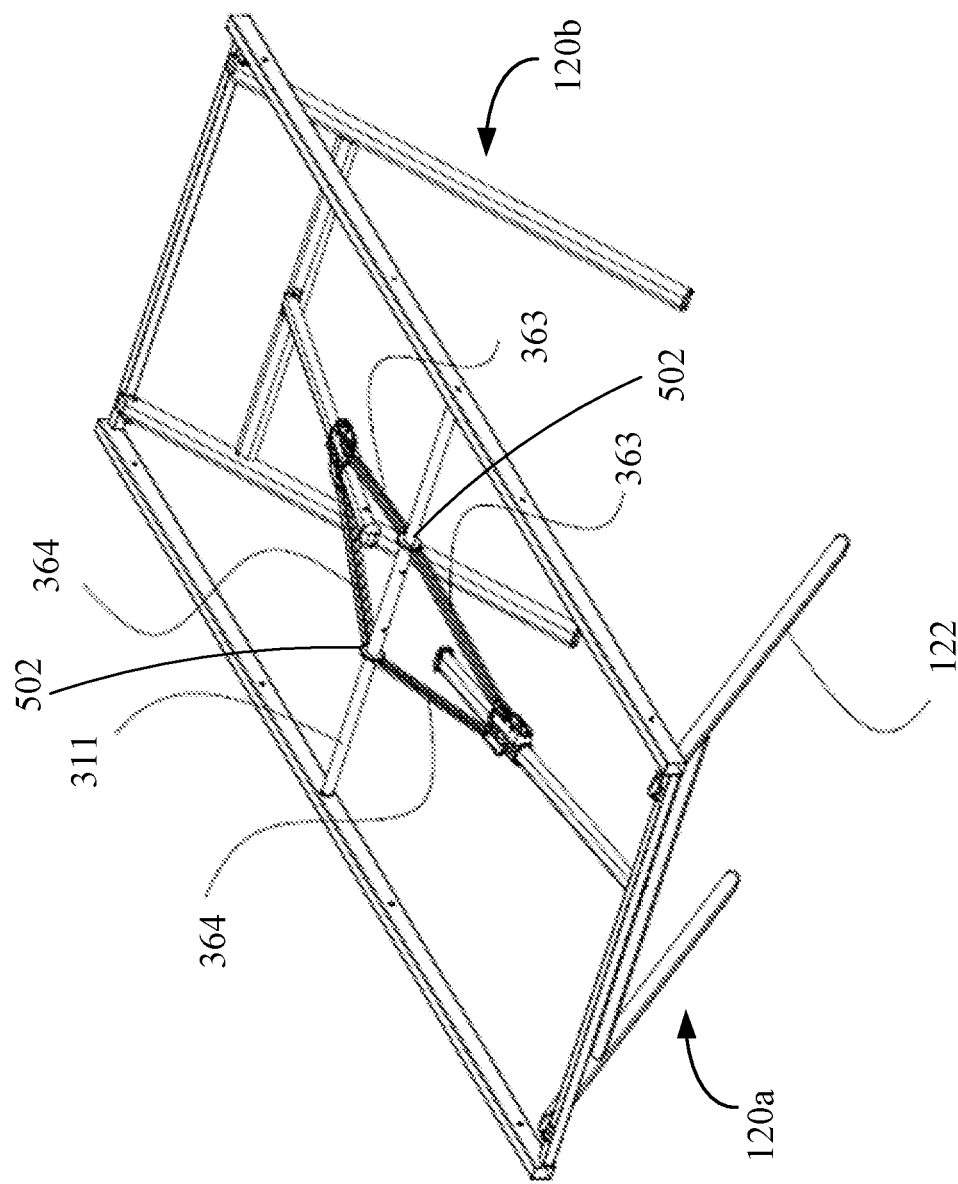
FIG. 5A is a perspective view illustrating an exemplary foldable frame in an intermediate state in accordance with exemplary embodiments of the present disclosure.
Figure 5B:
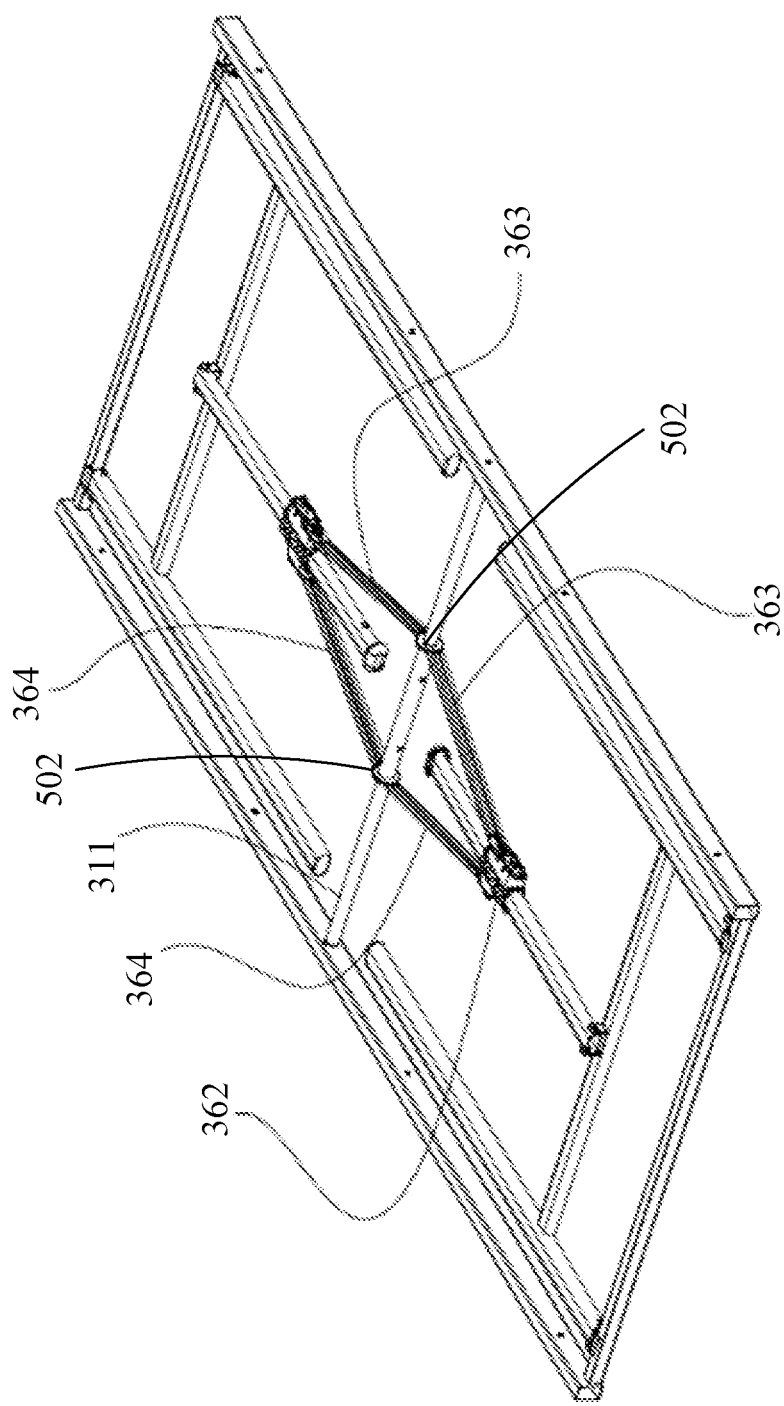
FIG. 5B is a perspective view illustrating the foldable frame of FIG. 5A in a folded state in accordance with exemplary embodiments of the present disclosure.

Referring to FIGS. 5A and 5B, in some exemplary embodiments, second members 363 of the first and second supporting assemblies are integrally formed with each other as a unitary piece. In an exemplary embodiment, the unitary piece is formed with a hole such as hole 502 to sleeve on connecting member 311 of the mounting assembly. Similarly, in some exemplary embodiments, third members 363 of the first and second supporting assemblies are integrally formed with each other as another unitary piece with a hole such as hole 502 to sleeve on connecting member 311 of the mounting assembly.

Figure 6A:
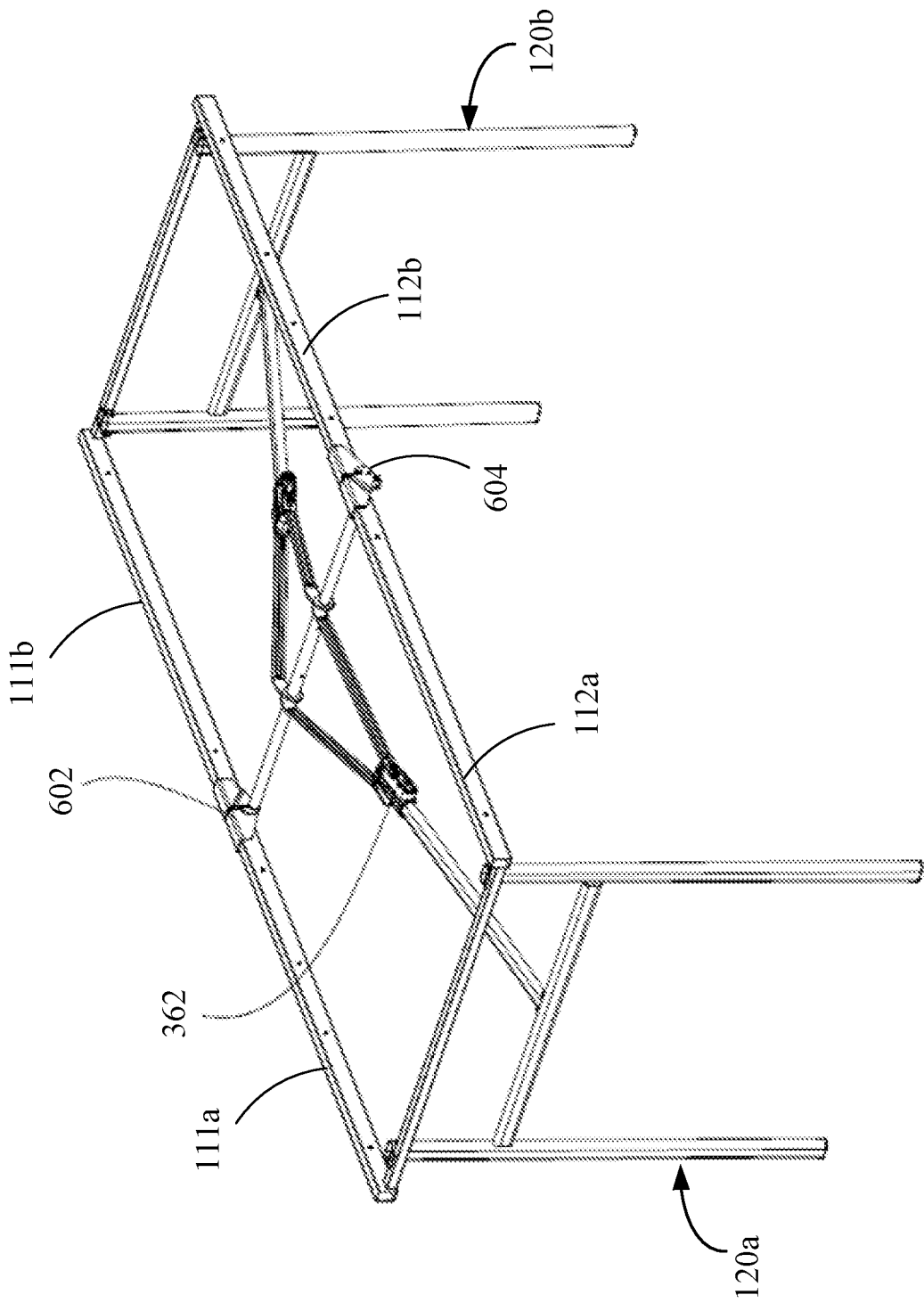
FIG. 6A is a perspective view illustrating an exemplary foldable frame in an unfolded state in accordance with exemplary embodiments of the present disclosure.
Figure 6B:
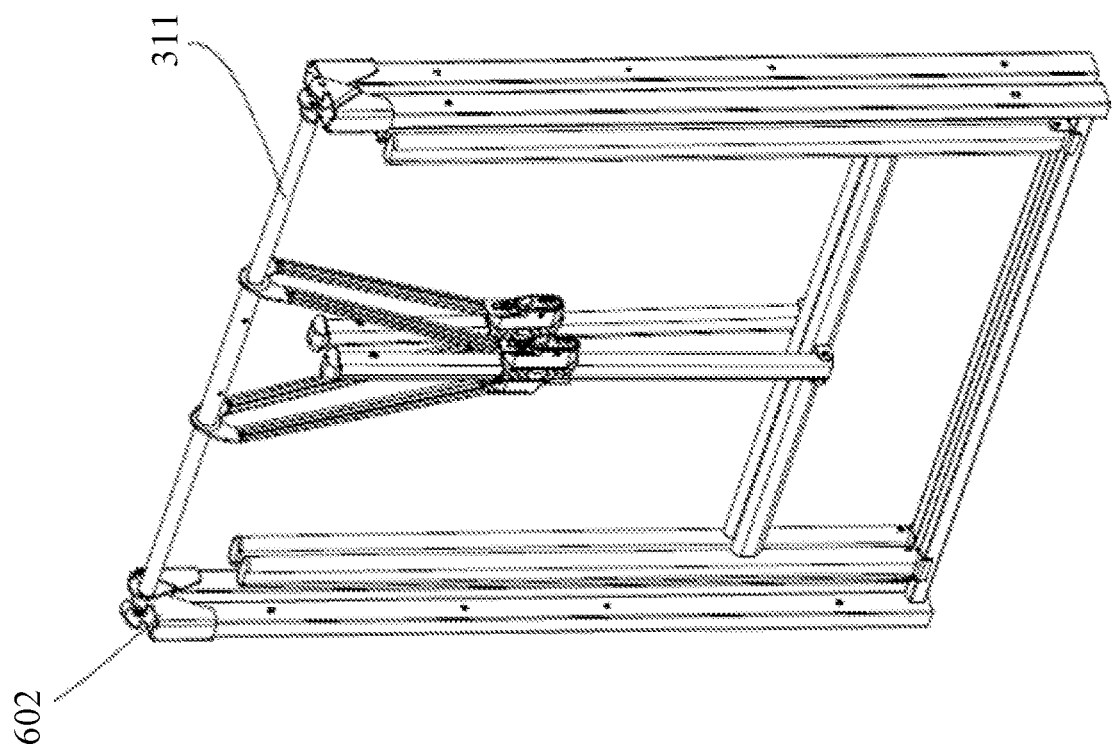
FIG. 6B is a perspective view illustrating the foldable frame of FIG. 6A in a folded state in accordance with exemplary embodiments of the present disclosure.

Referring to FIGS. 6A and 6B, in some exemplary embodiments, each of the first and second mounting members includes first and second mounting segments pivotally connected with each other so that the frame can be folded in half. For instance, in some exemplary embodiments, first mounting member 111 includes first mounting segment 111*a* and second mounting segment 111*b* pivotally coupled with each other at their proximal end portions by coupler 602. Second mounting member 112 includes first mounting segment 112*a* and second mounting segment 112*b* pivotally coupled with each other at their proximal end portions by coupler 604. Coupler 602 and coupler 604 can be the same as or different from each other. Examples of couplers for pivotally connecting two segments are disclosed in U.S. patent application Ser. Nos. 16/838,939, 16/838,944 and 16/838,947, the disclosure of each application is incorporated herein for all purposes by reference in its entirety. In an exemplary embodiment, the first end portion of connecting member 311 is connected to or integrally formed with coupler 602 and the second end portion of connecting member 311 is connected to or integrally formed with coupler 604.

Figure 7A:
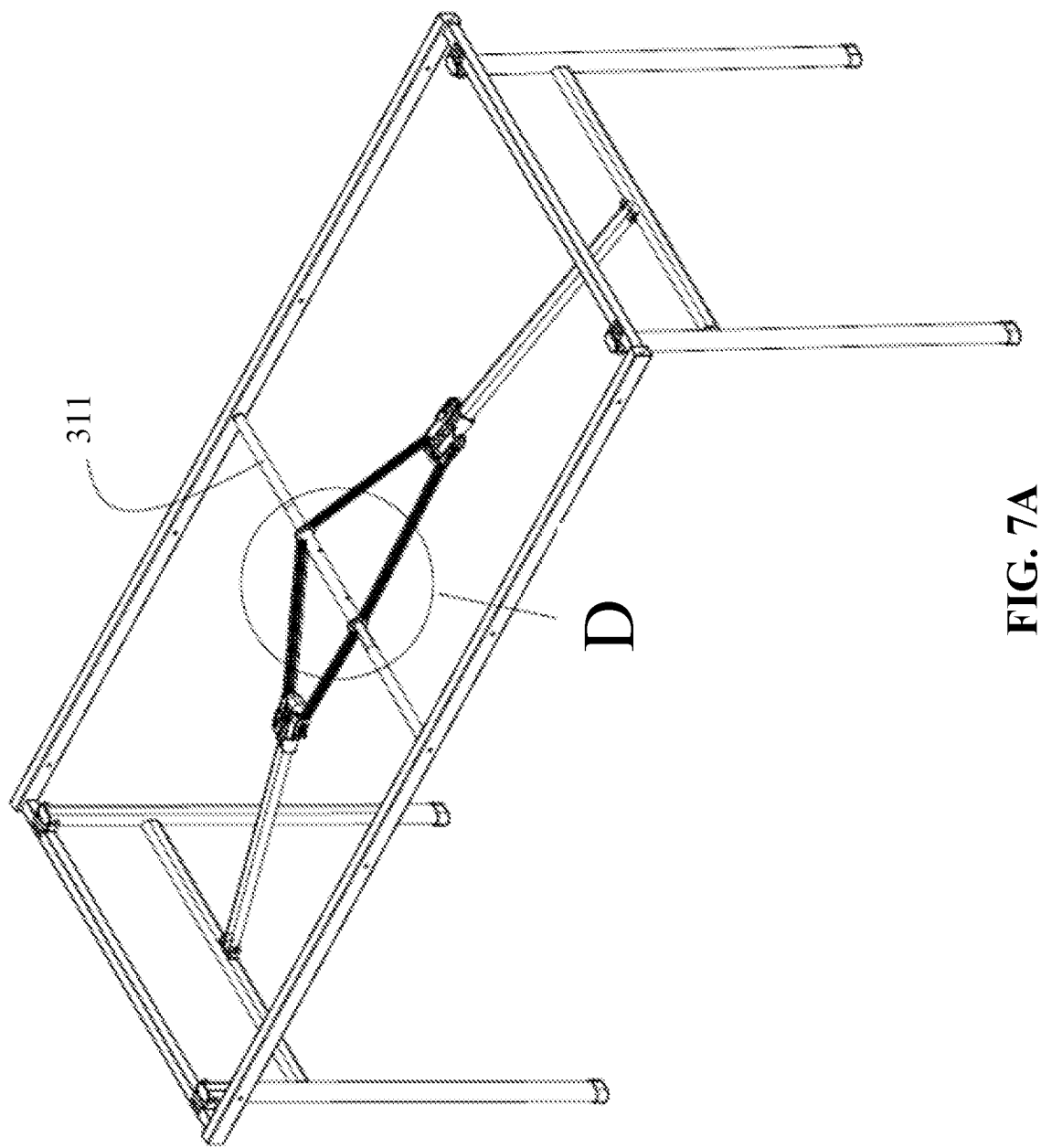
FIG. 7A is a perspective view illustrating an exemplary foldable frame in an unfolded state in accordance with exemplary embodiments of the present disclosure.
Figure 7B:
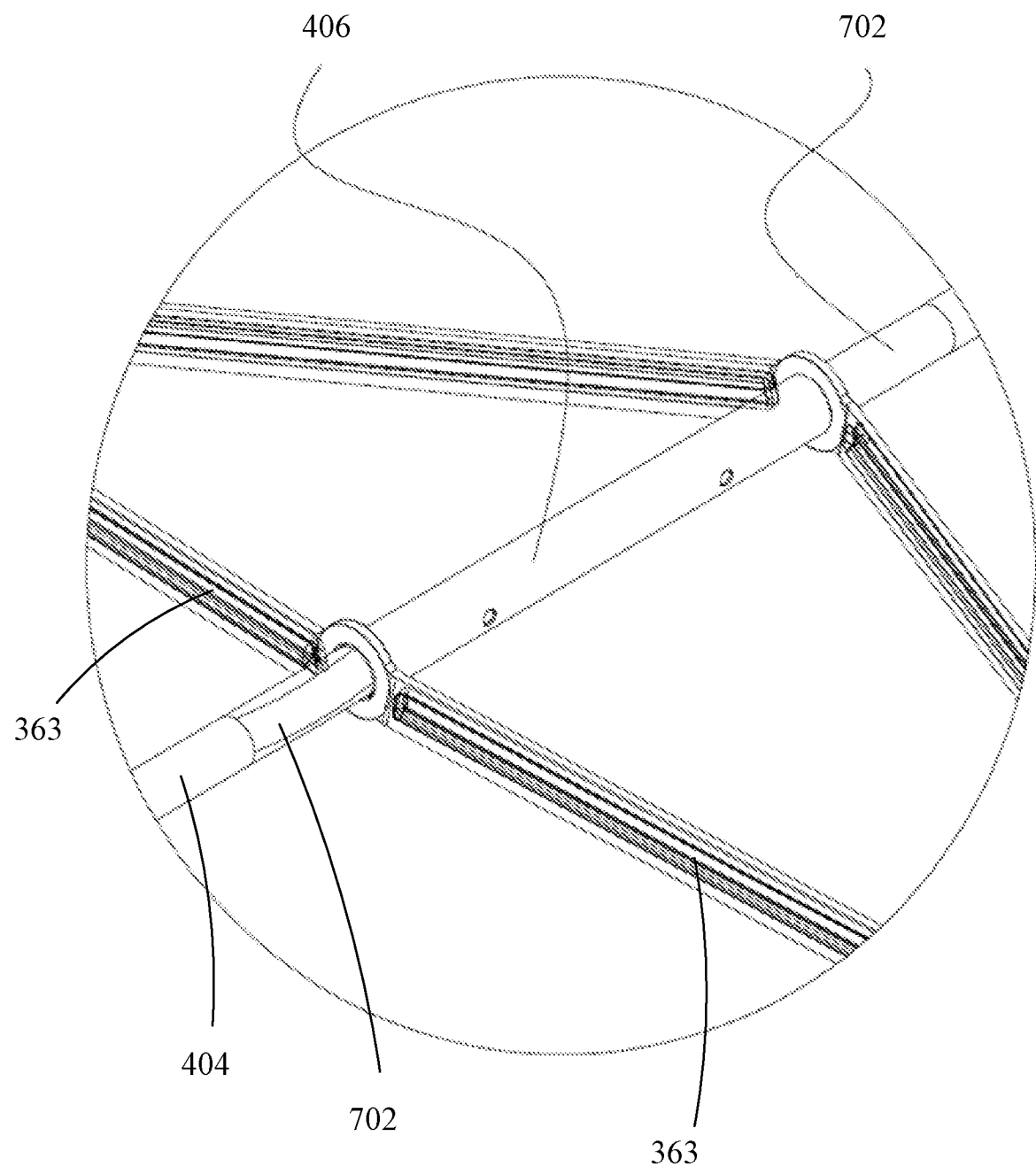
FIG. 7B is an enlarged view illustrating taken along circle D of FIG. 7A.

Referring to FIGS. 7A and 7B, in some exemplary embodiments, mounting member 311 includes one or more holding segments such as holding segment 702 configured to limit movement of the second end portion of the second or third member along the connecting member of the mounting assembly. In some exemplary embodiments, the second end portion of the second or third member is confined within the holding segment. In an exemplary embodiment, there are two holding segments symmetrically disposed with respect to each other. One holding segment is for connecting with the second members of the first and second supporting assemblies, and the other is for connecting with the third members of the first and second supporting assemblies.

Figure 8A:
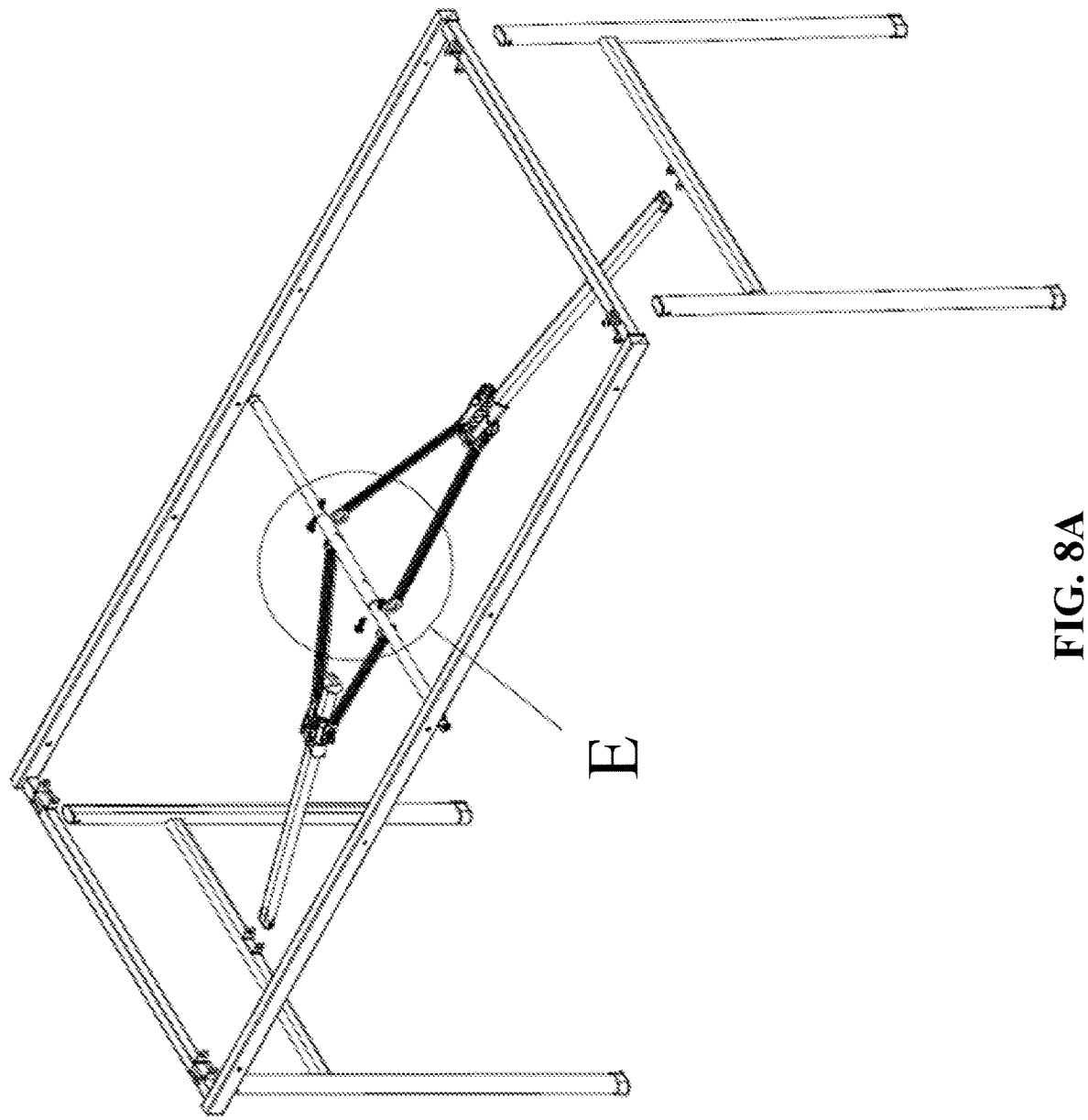
FIG. 8A is a partially disassembled view illustrating an exemplary foldable frame in accordance with exemplary embodiments of the present disclosure.
Figure 8B:
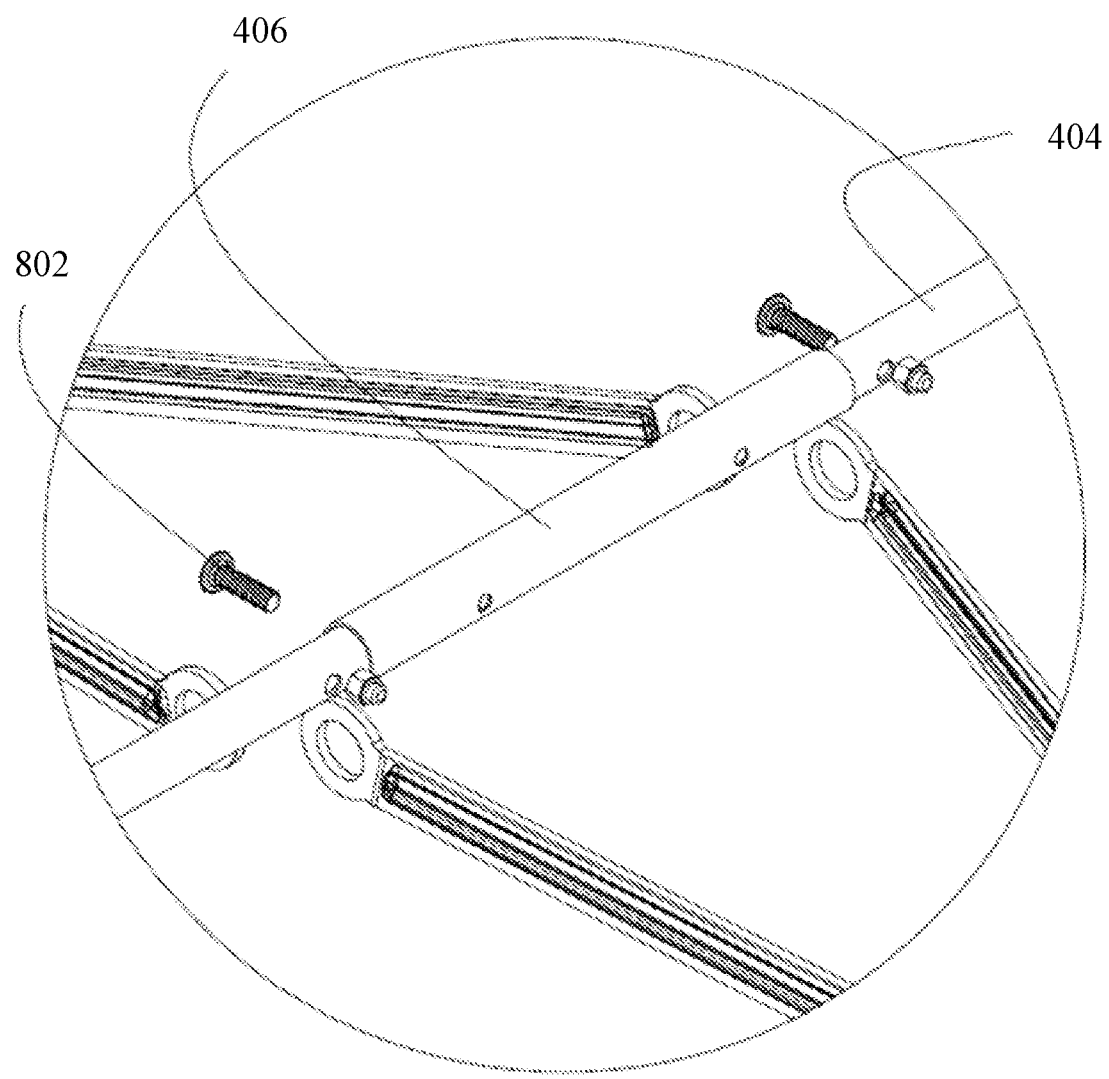
FIG. 8B is an enlarged view illustrating taken along circle E of FIG. 8A.

Referring to FIGS. 8A and 8B, in some exemplary embodiments, one or more additional or optional stoppers are used to limit movement of the second end portion of the second or third member along the connecting member of the mounting assembly. The stopper can be a fastener, a sheath, a sheet, a block, or the like, and can be disposed at various positions. By way of example, FIGS. 8A and 8B illustrate a fastener (e.g., screw, bolt, pin, or the like) such as fastener 802 disposed at first segment 404 of the mounting member. Together with second segment 406, fastener 802 places a limit on the movement of the second end portion of the second or third member along the connecting member of the mounting assembly.

Figure 9A:
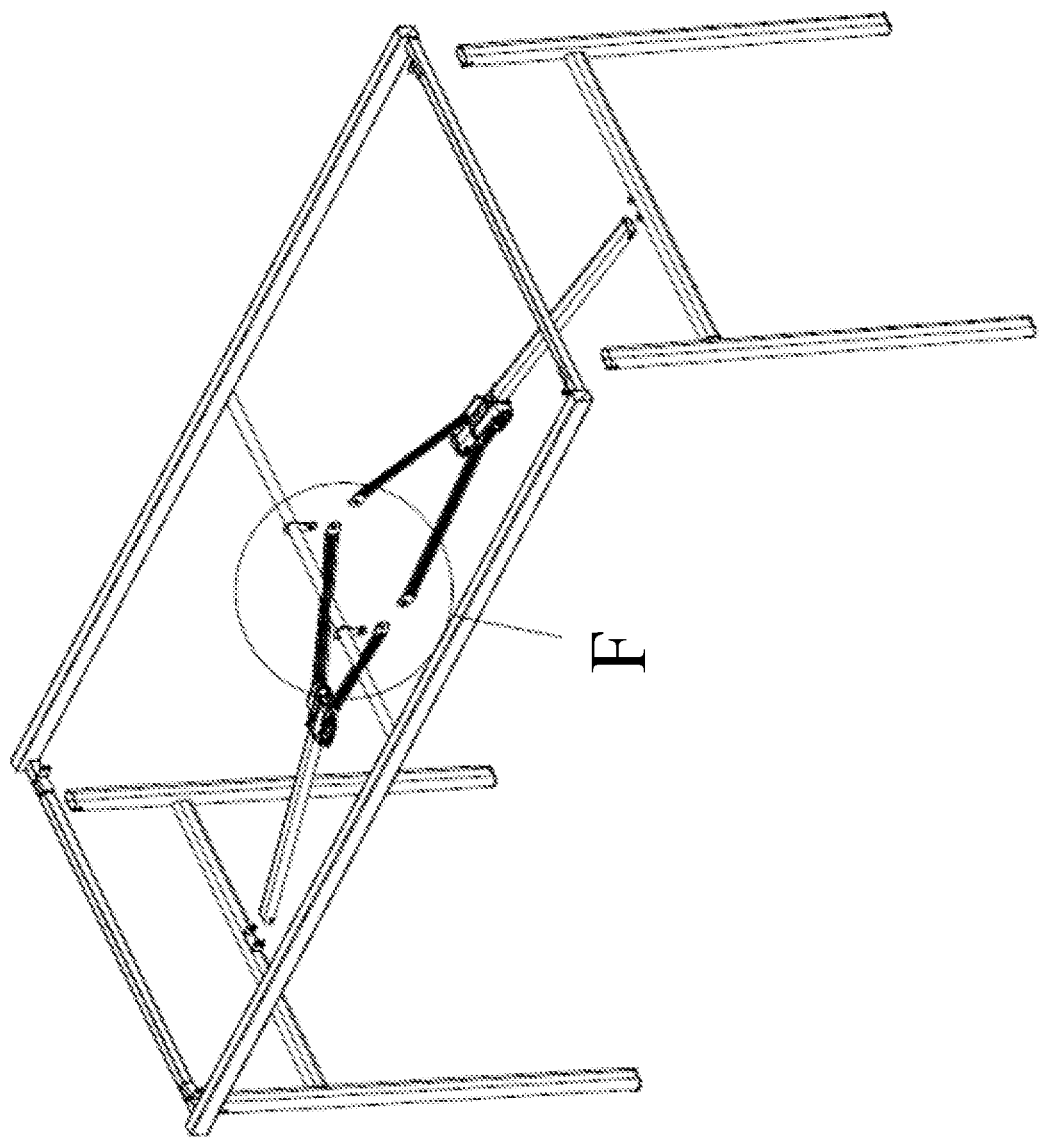
FIG. 9A is a partially disassembled view illustrating an exemplary foldable frame in accordance with exemplary embodiments of the present disclosure.
Figure 9B:
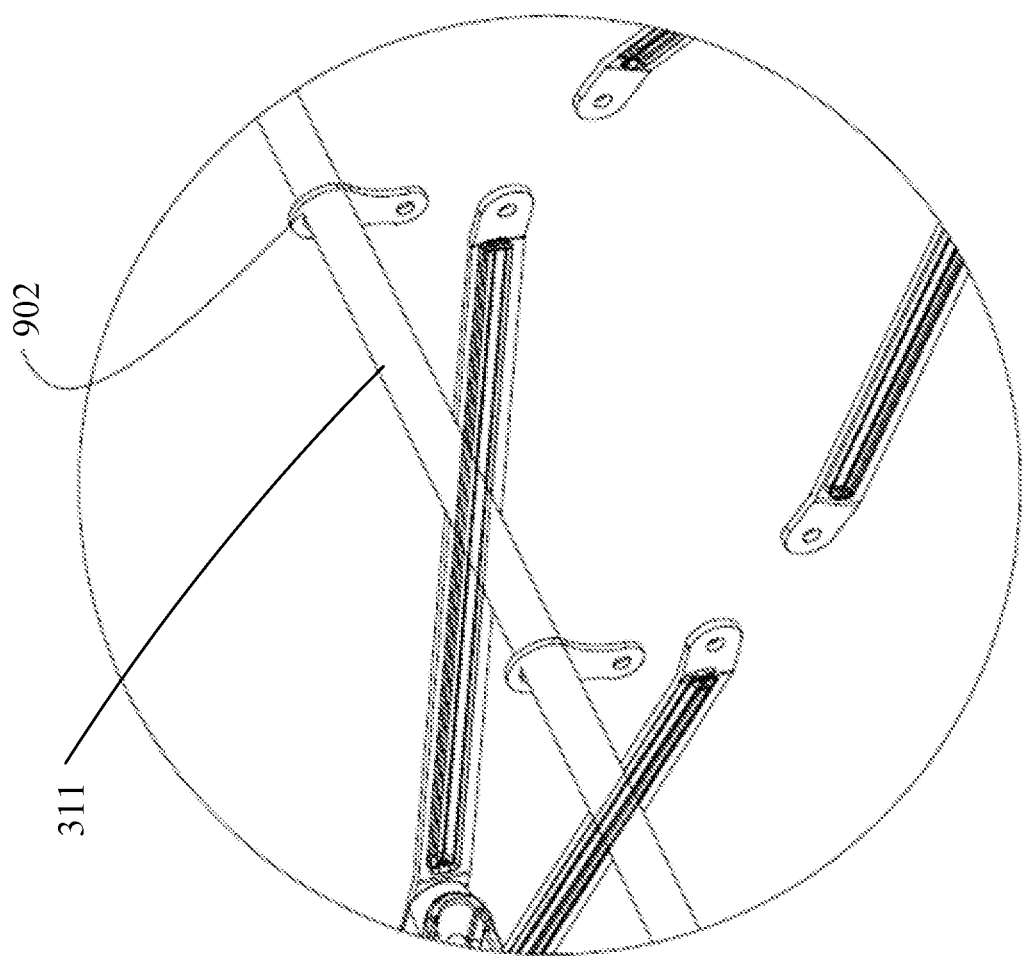
FIG. 9B is an enlarged view illustrating taken along circle F of FIG. 9A.

Referring to FIGS. 9A and 9B, in some exemplary embodiments, the foldable frame includes one or more coupling pieces disposed at the mounting member of the mounting assembly to couple with the second or third member of the supporting assembly. For instance, in an exemplary embodiment, two coupling pieces 902 are fixedly disposed at connecting member 311 of the mounting assembly. One coupling piece is configured to pivotally connect the second members of the first and second supporting assemblies, for instance, by a fastener through the holes formed at the coupling piece and at the second end portions of the second members. The other coupling piece is configured to pivotally connect the third members of the first and second supporting assemblies.

While FIGS. 3A-9B illustrate first member 361 connected with the first or second leg assembly, it should be noted that the supporting assembly can be oriented differently to have the first member pivotally connected with the connecting member of the mounting assembly and the second and/or third members pivotally connected with the first or second leg assembly. It should also be noted that the components illustrated in the figures and disclosed herein are combinable in any useful number and combination.

The frames of the present disclosure can be used to make benches, tables, beds or the like. For instance, an exemplary table includes a table panel coupled with and supported by a frame of the present disclosure. In some exemplary embodiments, the table panel includes a first panel unit coupled with the first mounting segments of the first and second mounting members and a second panel unit coupled with the second mounting segments of the first and second mounting members, making the table foldable in half. The frames and the furniture made of the frames of the present disclosure are easy to use, convenient to transport and stable in use.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "top" or "bottom", "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first bar could be termed a second bar, and, similarly, a second bar could be termed a first bar, without changing the meaning of the description, so long as all occurrences of the "first bar" are renamed consistently and all occurrences of the "second bar" are renamed consistently.

What is claimed is:

1. A foldable frame comprising:
a mounting assembly comprising:
  a first mounting member;
  a second mounting member spaced apart from the first mounting member; and
  a connecting member disposed between the first and second mounting members, the connecting member having a first end portion connected to or integrally formed with the first mounting member and a second end portion connected to or integrally formed with the second mounting member;
first and second leg assemblies, wherein
  the first leg assembly is pivotally connected with the mounting assembly at a first side of the mounting assembly; and
  the second leg assembly is pivotally connected with the mounting assembly at a second side of the mounting assembly;
first and second supporting assemblies, wherein
  the first supporting assembly is pivotally connected with the first leg assembly and the connecting member of the mounting assembly and configured to control rotation of the first leg assembly with respect to the mounting assembly; and
  the second supporting assembly is pivotally connected with the second leg assembly and the connecting member of the mounting assembly and configured to control rotation of the second leg assembly with respect to the mounting assembly,
wherein when folded, the first and second leg assemblies are disposed in an interior defined by the mounting assembly and are substantially on a same plane as the mounting assembly;
wherein the mounting assembly further comprises third and fourth mounting members, each connected to or integrally formed with the first and second mounting members, wherein the third and fourth mounting members are spaced apart from each other with the third mounting member disposed at the first side of the mounting assembly and the fourth mounting member disposed at the second side of the mounting assembly;
wherein a respective leg assembly in the first and second leg assemblies is pivotally connected with the mounting assembly by one or more mounting couplers connected to or integrally formed with a corresponding mounting member in the third and fourth mounting members; and
wherein:
  each of the one or more mounting couplers comprises one or more lugs; and
  the respective leg assembly comprises one or more legs, wherein each respective leg in the one or more legs is pivotally coupled with the one or more lugs of a corresponding coupler in the one or more couplers by a fastener through openings formed at the one or more lugs and at the respective leg.

2. A foldable frame comprising:
a mounting assembly comprising:
  a first mounting member;
  a second mounting member spaced apart from the first mounting member; and
  a connecting member disposed between the first and second mounting members, the connecting member having a first end portion connected to or integrally formed with the first mounting member and a second end portion connected to or integrally formed with the second mounting member;
first and second leg assemblies, wherein
  the first leg assembly is pivotally connected with the mounting assembly at a first side of the mounting assembly; and
  the second leg assembly is pivotally connected with the mounting assembly at a second side of the mounting assembly;
first and second supporting assemblies, wherein
  the first supporting assembly is pivotally connected with the first leg assembly and the connecting member of the mounting assembly and configured to control rotation of the first leg assembly with respect to the mounting assembly; and
  the second supporting assembly is pivotally connected with the second leg assembly and the connecting member of the mounting assembly and configured to control rotation of the second leg assembly with respect to the mounting assembly,
wherein when folded, the first and second leg assemblies are disposed in an interior defined by the mounting assembly and are substantially on a same plane as the mounting assembly;
wherein the mounting assembly further comprises third and fourth mounting members, each connected to or integrally formed with the first and second mounting members, wherein the third and fourth mounting members are spaced apart from each other with the third mounting member disposed at the first side of the mounting assembly and the fourth mounting member disposed at the second side of the mounting assembly;
wherein a respective leg assembly in the first and second leg assemblies is pivotally connected with the mounting assembly by one or more mounting couplers connected to or integrally formed with a corresponding mounting member in the third and fourth mounting members; and
wherein each of the one or more mounting couplers comprises an interference piece that abuts the respective leg assembly when unfolded, thereby assisting in stabilizing the foldable frame.

3. A foldable frame comprising:
a mounting assembly comprising:
  a first mounting member;

a second mounting member spaced apart from the first mounting member; and a connecting member disposed between the first and second mounting members, the connecting member having a first end portion connected to or integrally formed with the first mounting member and a second end portion connected to or integrally formed with the second mounting member;

first and second leg assemblies, wherein the first leg assembly is pivotally connected with the mounting assembly at a first side of the mounting assembly; and the second leg assembly is pivotally connected with the mounting assembly at a second side of the mounting assembly;

first and second supporting assemblies, wherein the first supporting assembly is pivotally connected with the first leg assembly and the connecting member of the mounting assembly and configured to control rotation of the first leg assembly with respect to the mounting assembly; and the second supporting assembly is pivotally connected with the second leg assembly and the connecting member of the mounting assembly and configured to control rotation of the second leg assembly with respect to the mounting assembly, wherein when folded, the first and second leg assemblies are disposed in an interior defined by the mounting assembly and are substantially on a same plane as the mounting assembly;

wherein a respective supporting assembly in the first and second supporting assemblies comprises:

a first member pivotally connected with a corresponding leg assembly in the first and second leg assemblies;

a controller connected with the first member and selectively movable along the first member; and a second member and a third member, each having a first end portion pivotally connected with the controller and a second end portion pivotally connected with the connecting member of the mounting assembly.

4. The foldable frame of claim 3, wherein the second end portion of the second or third member of the respective supporting assembly is formed with a hole through which the connecting member of the mounting assembly passes.

5. The foldable frame of claim 3, wherein the second or third member of the first supporting assembly is integrally formed with the second or third member of the second supporting assembly as a unitary piece.

6. The foldable frame of claim 5, wherein the connecting member of the mounting assembly passes a hole formed in the unitary piece.

7. The foldable frame of claim 3, wherein the connecting member of the mounting assembly comprises:

one or more holding segments, each configured to couple with the second end portion of the second or third member of the respective supporting assembly and to limit movement of the second end portion of the second or third member along the connecting member of the mounting assembly.

8. The foldable frame of claim 3, wherein one or more stoppers are disposed at the connecting member of the mounting assembly and configured to limit movement of the second end portion of the second or third member along the connecting member of the mounting assembly.

9. The foldable frame of claim 3, wherein one or more coupling pieces are fixedly disposed at the connecting member of the mounting assembly, each configured to pivotally connect the second members of the first and second supporting assemblies or to pivotally connect the third members of the first and second supporting assemblies.

10. The foldable frame of claim 9, wherein the one or more coupling pieces comprise a first coupling piece configured to pivotally connect the second members of the first and second supporting assemblies and a second coupling piece configured to pivotally connect the third members of the first and second supporting assemblies.

11. The foldable frame of claim 9, wherein each of the one or more coupling pieces comprises a first coupling element disposed at a first side of the connecting member to pivotally connect the second or third member of the first supporting assembly and a second coupling element disposed at a second side of the connecting member to pivotally connect the second or third member of the second supporting assembly.

12. The foldable frame of claim 11, wherein the first or second coupling element is an opening, a rivet or a fastener.

13. The foldable frame of claim 3, wherein each of the first and second mounting members comprises first and second mounting segments, the foldable frame further comprises:

a third coupler pivotally connecting proximal end portions of the first and second mounting segments of the first mounting member; and a fourth coupler pivotally connecting proximal end portions of the first and second mounting segments of the second mounting member, wherein the first end portion of the connecting member is connected to or integrally formed with the third coupler and the second end portion of the connecting member is connected to or integrally formed with the fourth coupler.

14. The foldable frame of claim 3, wherein:

a respective leg assembly in the first and second leg assemblies comprises a first leg, a second leg, and a lateral bar, wherein the lateral bar is disposed between the first and second legs and connected to or integrally formed with the first and second legs; and a corresponding supporting assembly in the first and second supporting assemblies is pivotally connected with the lateral bar of the respective leg assembly.

* * * * *